US009678596B2

(12) United States Patent
Miyazaki

(10) Patent No.: US 9,678,596 B2
(45) Date of Patent: *Jun. 13, 2017

(54) NON-TRANSITORY STORAGE MEDIUM STORING INSTRUCTIONS EXECUTABLE BY COMMUNICATION TERMINAL, COMMUNICATION TERMINAL, AND PROCESSING APPARATUS

(71) Applicant: BROTHER KOGYO KABUSHIKI KAISHA, Nagoya-shi, Aichi-ken (JP)

(72) Inventor: Sadaaki Miyazaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 23 days.

This patent is subject to a terminal disclaimer.

(21) Appl. No.: 14/493,805

(22) Filed: Sep. 23, 2014

(65) Prior Publication Data

US 2015/0091830 A1 Apr. 2, 2015

(30) Foreign Application Priority Data

Sep. 30, 2013 (JP) ................................ 2013-203967
Sep. 30, 2013 (JP) ................................ 2013-203971

(51) Int. Cl.
*G06F 3/041* (2006.01)
*G06F 3/0488* (2013.01)
*G06F 3/0484* (2013.01)

(52) U.S. Cl.
CPC .......... *G06F 3/0416* (2013.01); *G06F 3/0488* (2013.01); *G06F 3/04845* (2013.01); *G06F 2203/04104* (2013.01)

(58) Field of Classification Search
CPC .. G06F 3/0416; G06F 3/04845; G06F 3/0488; G06F 3/12; H04N 1/00129
(Continued)

(56) References Cited

U.S. PATENT DOCUMENTS 5,699,494 A * 12/1997 Colbert ................. G06F 3/1293
358/1.13
2005/0137885 A1* 6/2005 Nohgawa ............. G06Q 10/087
358/1.15
(Continued)

FOREIGN PATENT DOCUMENTS

JP 2010-081408 A 4/2010
JP 2012-070068 A 4/2012
JP 2013-008183 A 1/2013

*Primary Examiner* — Kenneth Bukowski
(74) *Attorney, Agent, or Firm* — Scully, Scott, Murphy & Presser, P.C.

(57) ABSTRACT

A non-transitory storage medium stores instructions executable by a communication terminal. The communication terminal includes: a display; an input device for detecting an instructed point where an instruction is provided with an input object; and a communication device for communicating with a processing apparatus. When executed by the computer, the instructions cause the communication terminal to: receive, from the processing apparatus, instruction image data for displaying an instruction image for instructing a processing to be executed by the processing apparatus; display the instruction image on the display based on the received instruction image data; and transmit, to the processing apparatus, an input event on the input device and coordinate information about the instructed point on the display which is detected by the input device in a state in which the instruction image is displayed.

21 Claims, 15 Drawing Sheets

(58) Field of Classification Search
CPC ........... H04N 1/00209; H04N 1/00307; H04N 1/00392; H04N 1/00411; H04N 1/0044; H04N 1/00474; H04N 2201/0075; H04N 2201/0094

See application file for complete search history.

(56) References Cited

U.S. PATENT DOCUMENTS

| | | | |
|---|---|---|---|
| 2009/0036056 A1* | 2/2009 | Oshima | H04M 1/7253 455/41.3 |
| 2010/0081383 A1 | 4/2010 | Takeda | |
| 2010/0199227 A1* | 8/2010 | Xiao | G06F 3/0481 715/863 |
| 2011/0116125 A1* | 5/2011 | Park | G06F 3/1204 358/1.15 |
| 2012/0069380 A1 | 3/2012 | Sugimoto | |
| 2012/0139952 A1* | 6/2012 | Imai | G09G 5/34 345/672 |

* cited by examiner

FIG.3

IMAGE DATA MAP (IN FLASH MEMORY 14)

| IMAGE DATA | SCREEN ID | REQUIREMENT OF STORING |
|---|---|---|
|  |  |  |
|  |  |  |
|  |  |  |

DRAWING START COORDINATES (X, Y)

$(x, y) = \left( \dfrac{A-X}{k}, \dfrac{B-Y}{k} \right)$

PRESSED LOCATION (A, B)

ENLARGEMENT RATIO : k

DRAWING START COORDINATES (X, Y)

DRAWING END COORDINATES (Xe, Ye)

$(m, n) = \left( \dfrac{A-X}{Xe-X}, \dfrac{B-Y}{Ye-Y} \right)$

PRESSED LOCATION (A, B)

(PROCESSINGS EXECUTED BY CPU OF MFP)

(EXECUTION OF OPERATION SUPPORT PROGRAM BY CPU OF TERMINAL)

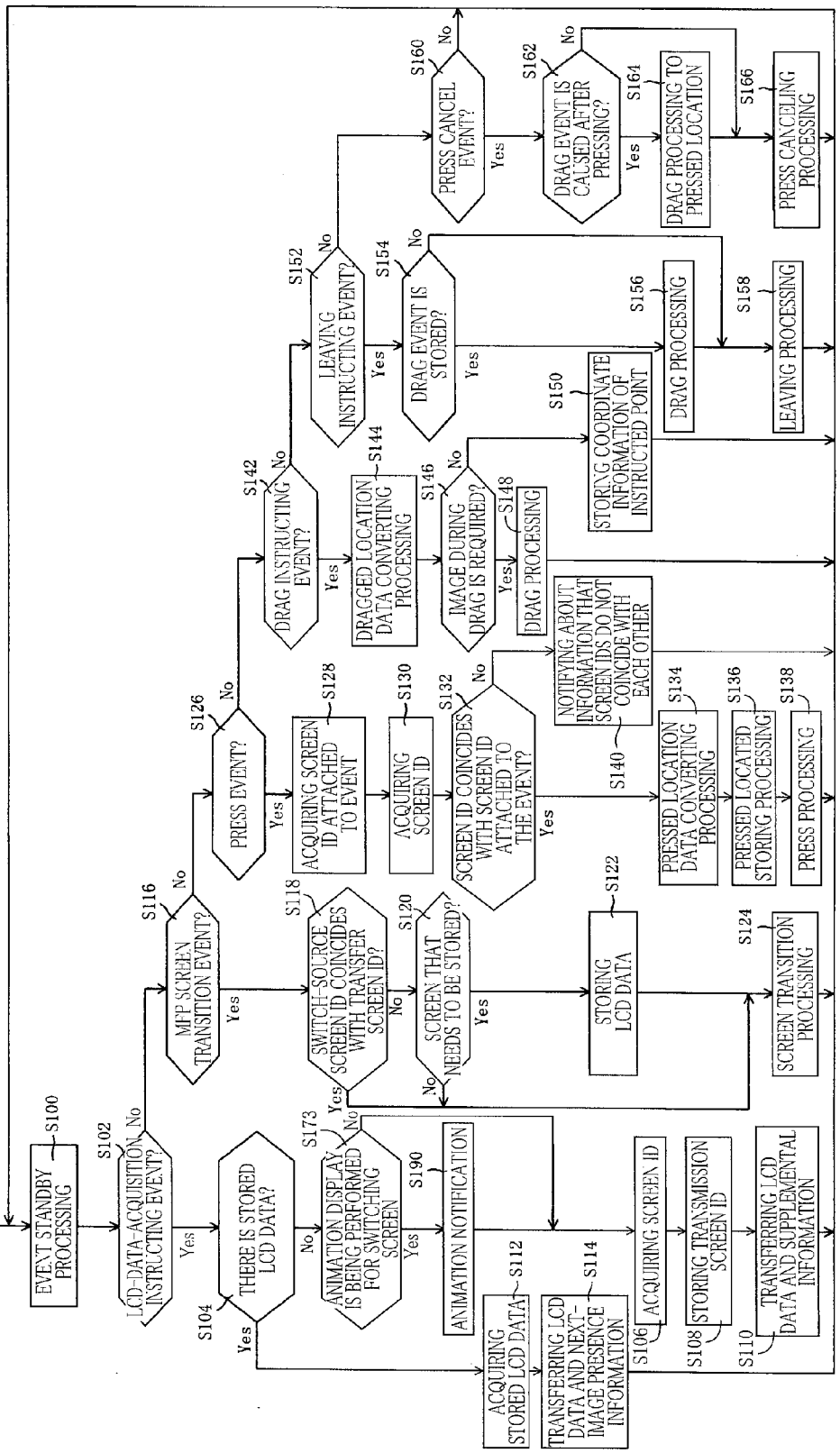

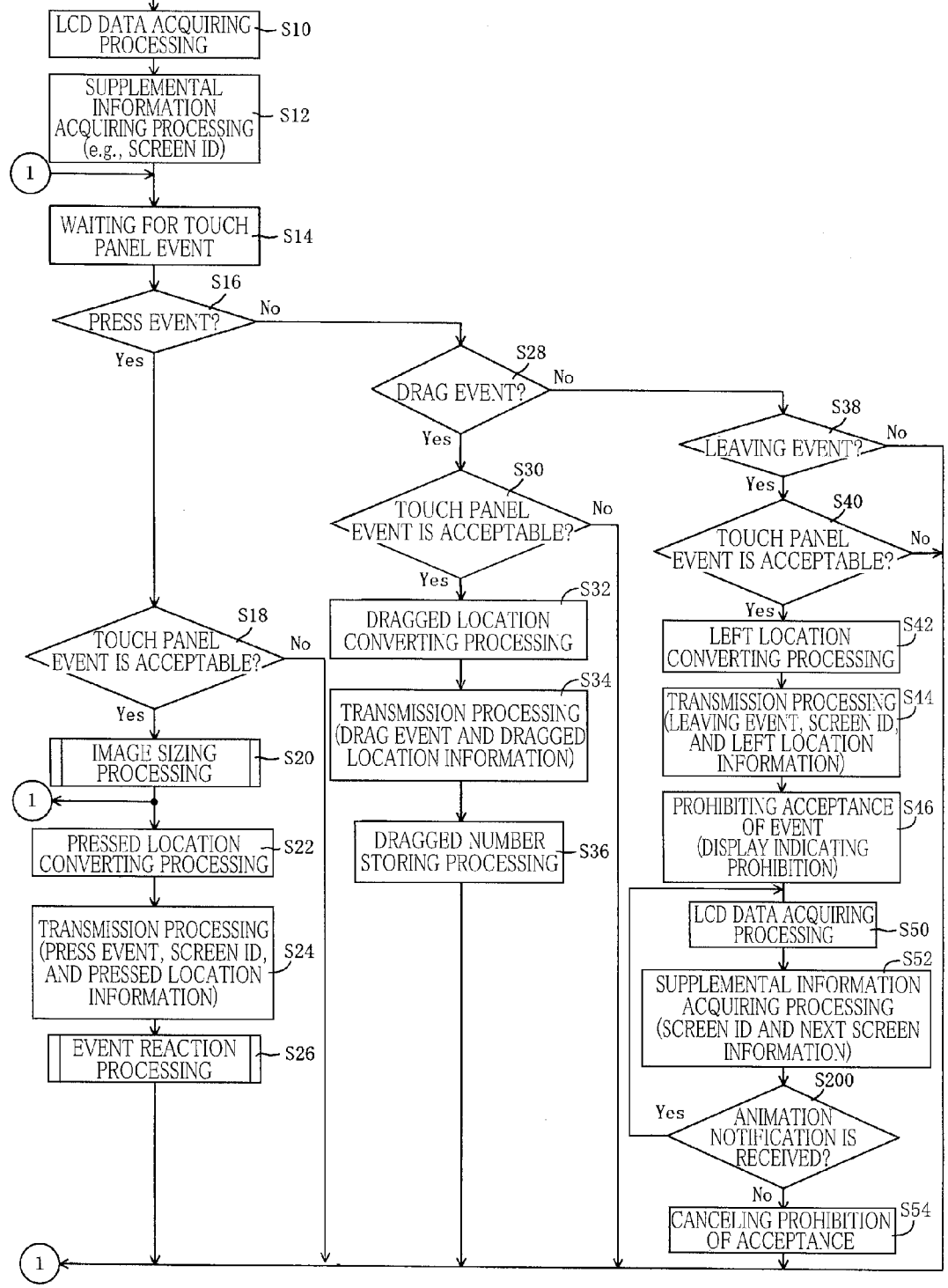

NON-TRANSITORY STORAGE MEDIUM STORING INSTRUCTIONS EXECUTABLE BY COMMUNICATION TERMINAL, COMMUNICATION TERMINAL, AND PROCESSING APPARATUS

CROSS REFERENCE TO RELATED APPLICATION

The present application claims priority from Japanese Patent Application Nos. 2013-203967 filed on Sep. 30, 2013, and 2013-203971 filed on Sep. 30, 2013, the disclosures of which are herein incorporated by reference in its entirety.

BACKGROUND

Technical Field

The present invention relates to a non-transitory storage medium storing a plurality of instructions executable by a computer of a communication terminal, the communication terminal, and a processing apparatus.

Description of the Related Art

A technique of remote control for controlling a multifunction peripheral (MFP) with a mobile terminal including a touch panel superposed on an LCD has been proposed, for example. Specifically, the LCD of the mobile terminal displays an image acquired by taking a picture of an operation unit of the MFP, and the MFP executes processings in response to an operation on the touch panel of the mobile terminal. That is, when a user has touched an image corresponding to a key assigned with, e.g., a copy processing among images displayed on the LCD, the mobile terminal instructs the MFP to execute the copy processing.

SUMMARY

The above-described technique causes problems that a function for instructing the MFP to execute a processing in response to an input operation on the touch panel of the mobile terminal needs to be created for each MFP and that functions need to be added or changed upon an update of the MFP.

This invention has been developed to provide (i) a non-transitory storage medium storing a plurality of instructions executable by a computer of a communication terminal including: a display device having a display region; an input device configured to detect an instructed point which is a point on the display region and at which an instruction is provided with an input object; a communication device configured to communicate with a processing apparatus; and a controller, (ii) the communication terminal, and (iii) the processing apparatus, each of the non-transitory storage medium, the communication terminal, and the processing apparatus being capable of providing versatility of a function of controlling the processing apparatus based on an input on the input device.

The present invention provides a non-transitory storage medium storing a plurality of instructions executable by a computer of a communication terminal. The communication terminal includes: a display; an input device configured to detect an instructed point which is a point on the display and at which an instruction is provided with an input object; and a communication device configured to communicate with a processing apparatus. When executed by the computer, the plurality of instructions cause the communication terminal to perform: receiving instruction image data from the processing apparatus, the instruction image data being for displaying, on the display, an instruction image for instructing a processing to be executed by the processing apparatus; displaying the instruction image on the display based on the received instruction image data; identifying an input event on the input device in response to an instruction provided on the input device with the input object in a state in which the instruction image is displayed; and transmitting, to the processing apparatus, the identified input event and coordinate information about the instructed point on the display which is detected by the input device in a state in which the instruction image is displayed.

The present invention also provides a communication terminal, including: a display; an input device configured to detect an instructed point which is a point on the display and at which an instruction is provided with an input object; a communication device configured to communicate with a processing apparatus; and a controller. The controller is configured to: receive instruction image data from the processing apparatus, the instruction image data being for displaying, on the display, an instruction image for instructing a processing to be executed by the processing apparatus; display the instruction image on the display based on the received instruction image data; identify an input event on the input device in response to an instruction provided on the input device with the input object in a state in which the instruction image is displayed; and transmit, to the processing apparatus, the identified input event and coordinate information about the instructed point on the display which is detected by the input device in a state in which the instruction image is displayed. The controller is configured to execute a control using at least one of a software processing and a hardware processing.

The present invention also provides a processing apparatus controllable by a communication terminal. The communication terminal includes: a display; an input device configured to detect an instructed point which is a point on the display and at which an instruction is provided with an input object; and a communication device configured to communicate with the processing apparatus. The processing apparatus includes a controller configured to: transmit instruction image data to the communication terminal, the instruction image data being for displaying, on the display, an instruction image for instructing a processing to be executed by the processing apparatus; receive, from the communication terminal, an input event on the input device and coordinate information about the instructed point on the display which is detected by the input device; and execute a processing based on the received input event and coordinate information.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 3 is a table illustrating an image data map;

FIG. 13 is a flow chart illustrating a procedure of processings to be executed by the MFP in a fourth embodiment;

FIG. 14 is a flow chart illustrating a procedure of processings to be executed by the mobile terminal.

DETAILED DESCRIPTION OF THE EMBODIMENTS

<First Embodiment>

Hereinafter, there will be described a first embodiment of the present invention by reference to the drawings.

Figure 1:
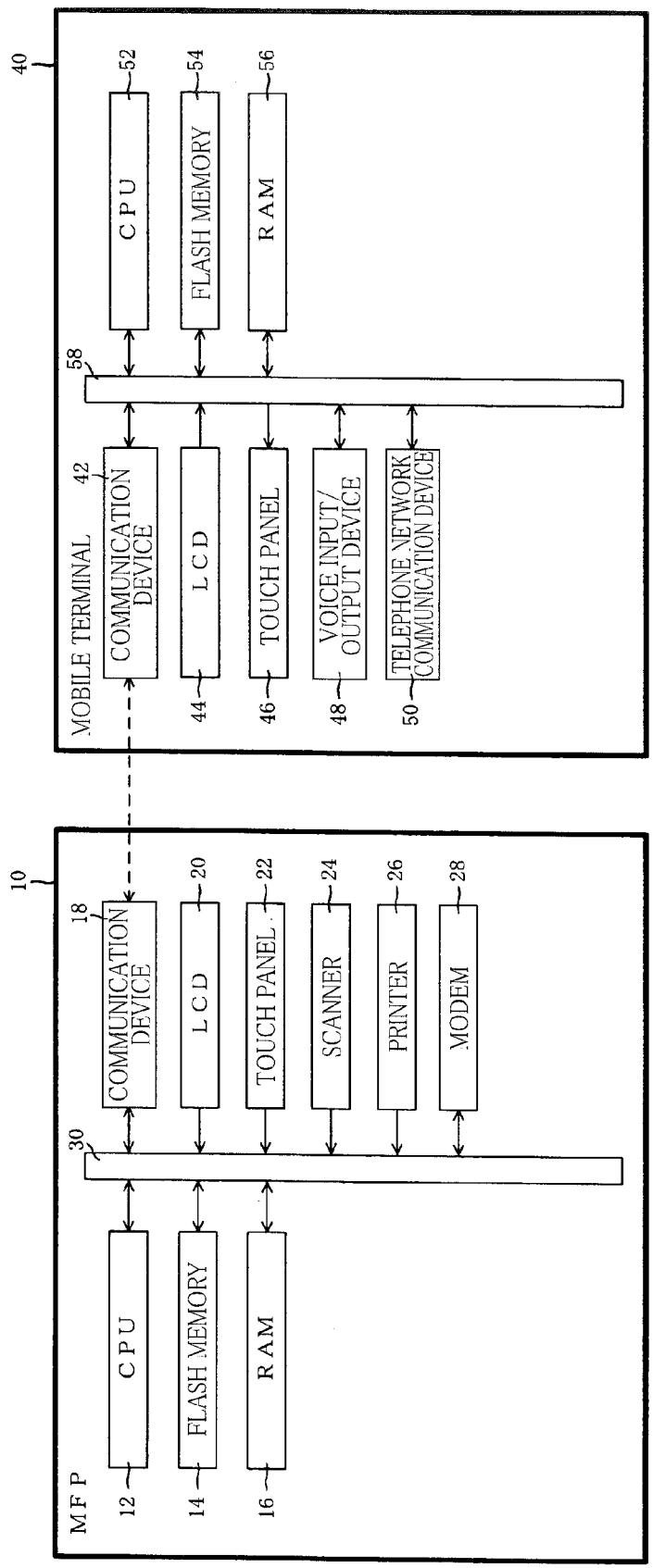
FIG. 1 is a block diagram illustrating a system according to a first embodiment.

FIG. 1 illustrates a system configuration in the present embodiment. A multi-function peripheral (MFP) 10 has various functions such as a printing function, a scanning function, and a facsimile function. The MFP 10 includes a CPU 12, a flash memory 14, a RAM 16, a communication device 18, a liquid crystal display (LCD) 20, a touch panel 22, a scanner 24, a printer 26, and a modem 28 which are connected to each other via input/output ports 30. The CPU 12 controls the functions of the MFP 10 and the devices connected to the input/output ports 30 according to fixed values and programs stored in the flash memory 14 and data stored in the RAM 16.

The flash memory 14 is a rewritable non-transitory memory, and the RAM 16 is a rewritable transitory memory. The LCD 20 is a liquid crystal display for displaying various kinds of screens thereon. The touch panel 22 is superposed on a display surface of the LCD 20. The touch panel 22 is a user interface for outputting instructed point information which indicates a location on the touch panel 22 at which an input object such as a finger and a stylus has touched or approached the touch panel 22. The location or point at which the input object has touched or approached the touch panel 22 may be hereinafter referred to as "instructed point".

The touch or approach of the input object on the touch panel 22 may be hereinafter referred to as "press of the input object on the touch panel 22", and an increase in distance between the input object and the touch panel 22 after pressing may be hereinafter referred to as "leaving". Also, an operation of moving or displacing the instructed point by moving the input object without leaving it after pressing may be hereinafter referred to as "drag operation". In the present embodiment, the instructed point is a center of an area on the touch panel 22, which area is an area where the touch or approach of the input object has been detected by the touch panel 22. However, the instructed point may be another location. For example, the instructed point may be any point on the area on the touch panel 22, or the area itself. These definitions may apply to a touch panel 46 of a mobile terminal 40.

The scanner 24 reads a document to convert a read image to image data. The printer 26 records an image on a recording sheet based on image data. The modem 28 upon facsimile transmission converts image data to be transmitted, into a signal transmittable to a telephone line network, not shown, and transmits the signal to the telephone line network. Also, the modem 28 receives a signal from the telephone line network to decode the signal into image data. The communication device 18 is an interface for carrying out wireless communication. In the present embodiment, the wireless communication carried out by the communication device 18 is Wi-Fi™ communication adhering to the IEEE802.11b/g standard.

The mobile terminal 40 is a device such as a smartphone and a mobile phone. The mobile terminal 40 includes a communication device 42, an LCD 44, the touch panel 46, a voice input/output device 48, a telephone network communication device 50, a CPU 52, a flash memory 54, and a RAM 56 which are connected to each other via an input/output ports 58. The CPU 52 controls the devices connected to the input/output ports 58 according to fixed values and programs stored in the flash memory 54, for example.

The flash memory 54 is a rewritable non-transitory memory, and the RAM 56 is a rewritable transitory memory. The LCD 44 is a liquid crystal display for displaying various kinds of screens thereon. The touch panel 46 superposed on a display surface of the LCD 44 is a user interface for outputting instructed point information which indicates a location on the touch panel 46 at which an input object such as a finger and a stylus has touched or approached the touch panel 46.

The voice input/output device 48 is constituted by, e.g., a microphone and a speaker. The telephone network communication device 50 is a circuit for conversation over a mobile phone network, not shown. The communication device 42 is an interface for carrying out wireless communication. In the present embodiment, the wireless communication carried out by the communication device 42 is Wi-Fi™ communication adhering to the IEEE802.11b/g standard. The mobile terminal 40 is connected to the MFP 10 including the communication device 18 through the Wi-Fi communication in an infrastructure mode in which connection is established via the communication device 42 and an access point, not shown, as a relay device.

Figure 2A:
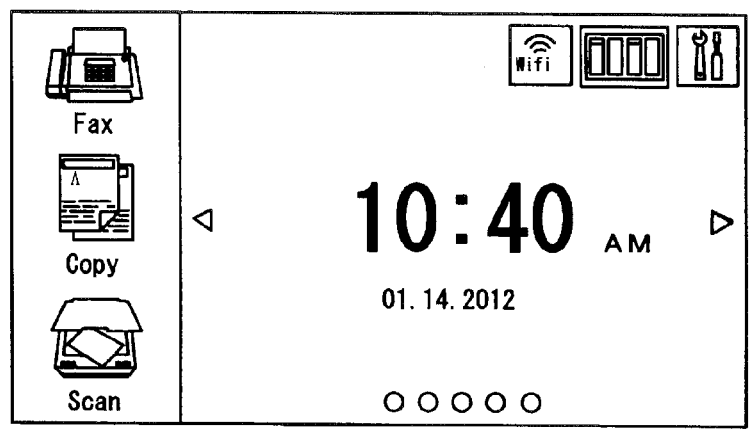
FIGS. 2A-2C are views for explaining a processing for switching a screen.
Figure 2B:
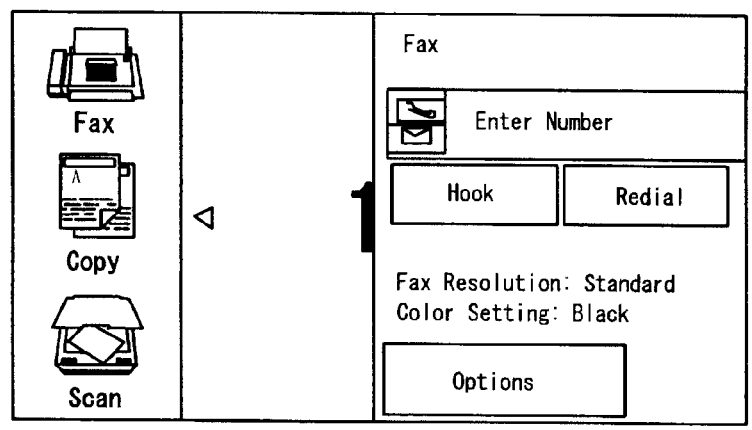
Figure 2C:
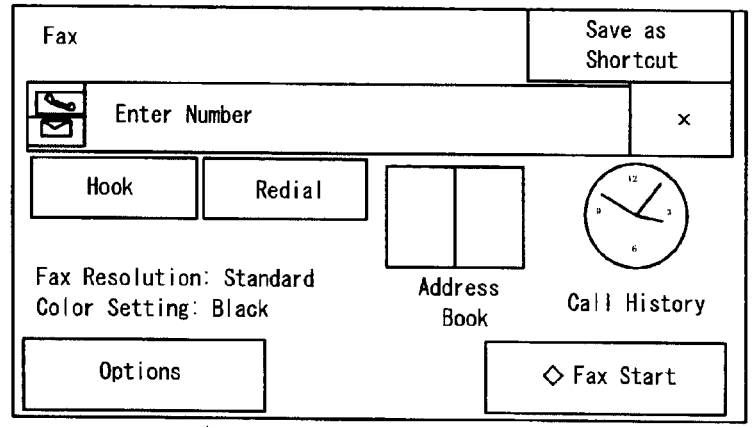

The MFP 10 displays images for guiding input operations using the input object, on a display region 20a of the LCD 20 and executes various kinds of processings such as a facsimile transmission processing, a print processing, and a scan processing in response to an input operation performed on the touch panel 22 such as pressing, dragging, and leaving. However, since the display region 20a of the LCD 20 is not so large, all the images including objects (images) for guiding the input operations for instructing execution of the processings cannot be displayed on the display region 20a at a time. To address this problem, the MFP 10 in the present embodiment can switch an image displayed on the display region 20a of the LCD 20. FIG. 2A illustrates one example of an image displayed on the display region 20a of the LCD 20, and FIG. 2C illustrates another example of the image displayed on the display region 20a of the LCD 20. In FIG. 2A, the images displayed include: an object for designating the facsimile function (i.e., the Fax button); an object for designating the copying function (i.e., the Copy button); and an object for designating the scanning function (i.e., the Scan button). In FIG. 2C, the images displayed include objects for instructing various kinds of processings related to the facsimile function such as an object for instructing execution of the facsimile function (i.e., the Fax Start button).

In the present embodiment, when the image displayed on the display region 20a of the LCD 20 is switched on the MFP 10, the MFP 10 changes the image using an animation display in which the image is displaced at such a speed that a user can visually recognize at least positions of the objects on the image displayed on the display region 20a. That is, in a case where the image displayed on the display region 20a is switched from the image illustrated in FIG. 2A to the image illustrated in FIG. 2C, the image (the entire screen) to be displayed after the switch is gradually slid, during the switch of the image, from the right side of the image displayed before the switch (i.e., the right side of the entire screen). FIG. 2B illustrates a screen on which the image is being slid. In this period, the touch panel 22 of the MFP 10 does not accept or receive the input operation.

The image displayed on the display region 20a of the LCD 20 is switched fundamentally in response to the input operation performed by the user. Specifically, the image is switched when the input object has left the touch panel 22 after the user had pressed the object for triggering screen transition on the touch panel 22. That is, in the present embodiment, pressing on the touch panel 22 means an operation of choosing the location of the instructed point, and the leaving operation means an operation of confirming the location of the instructed point. It is noted that the location of the pressed instructed point is stored into the RAM 16.

In the present embodiment, when information which should be notified to the user is generated in the MFP 10, the screen on the display region 20a of the LCD 20 may be switched without the leaving operation on the touch panel 22, i.e., without pressing an object for triggering screen transition and leaving the touch panel 22. Here, the information which should be notified to the user is generated when a remaining amount of ink in the printer 26 becomes low, for example. This screen transition is fundamentally provided as a pop-up display. It is noted that the pop-up display is one kind of display in which an image appears on the display region 20a for a predetermined length of time and then disappears.

In the present embodiment, each screen to be displayed on the display region 20a of the LCD 20 is assigned with information or a screen ID for identifying the screen. FIG. 3 illustrates an image data map stored in the flash memory 14 of the MFP 10, and this image data map represents a relationship between each screen ID and a corresponding image. Specifically, for each image data, the image data map represents a relationship among the image data, the screen ID, and information of whether storing is required or not. The information of whether storing is required or not will be explained later in detail in explanation of a processing at S120 in FIG. 9.

The MFP 10 can execute the functions not only in response to the input operations on the touch panel 22 but also in response to instructions transmitted from the mobile terminal 40. To enable this function, the LCD 44 of the mobile terminal 40 can display the image displayed on the display region 20a for guiding the input operation using the input object in the present embodiment. That is, the MFP 10 sends the mobile terminal 40 image data representative of this image, and the mobile terminal 40 displays an image based on the received image data on a display region 44a of the LCD 44. This configuration allows the user to use the input object to perform the input operation on the touch panel 46 according to the image displayed on the display region 44a of the LCD 44. When the input operation is performed by the user, the mobile terminal 40 sends the MFP 10 coordinate information about the instructed point at which the input operation is performed on the display region 44a of the touch panel 46 of the LCD 44. As explained later in detail with reference to FIG. 7, the coordinate information allows the MFP 10 to recognize which position is instructed on the image displayed on the display region 20a of the LCD 20. For example, in a case where the instructed point is located on the object displayed on the display region 44a for instructing execution of the print processing, the MFP 10 based on the coordinate information recognizes the instruction of execution of the print processing and executes the print processing. Thus, the user can operate the MFP 10 by performing the input operation on the touch panel 46 of the mobile terminal 40. In this operation, the mobile terminal 40 only notifies the MFP 10 of the coordinate information about the instructed point and a type of an input event on the touch panel 46 (e.g., pressing, dragging, or leaving), eliminating a need for the mobile terminal 40 to recognize which kind of processing of the MFP 10 is instructed by the input operation on the touch panel 46.

There will be next explained, with reference to drawings, processings executed when operations of the MFP 10 are instructed from the mobile terminal 40.

Figure 4:
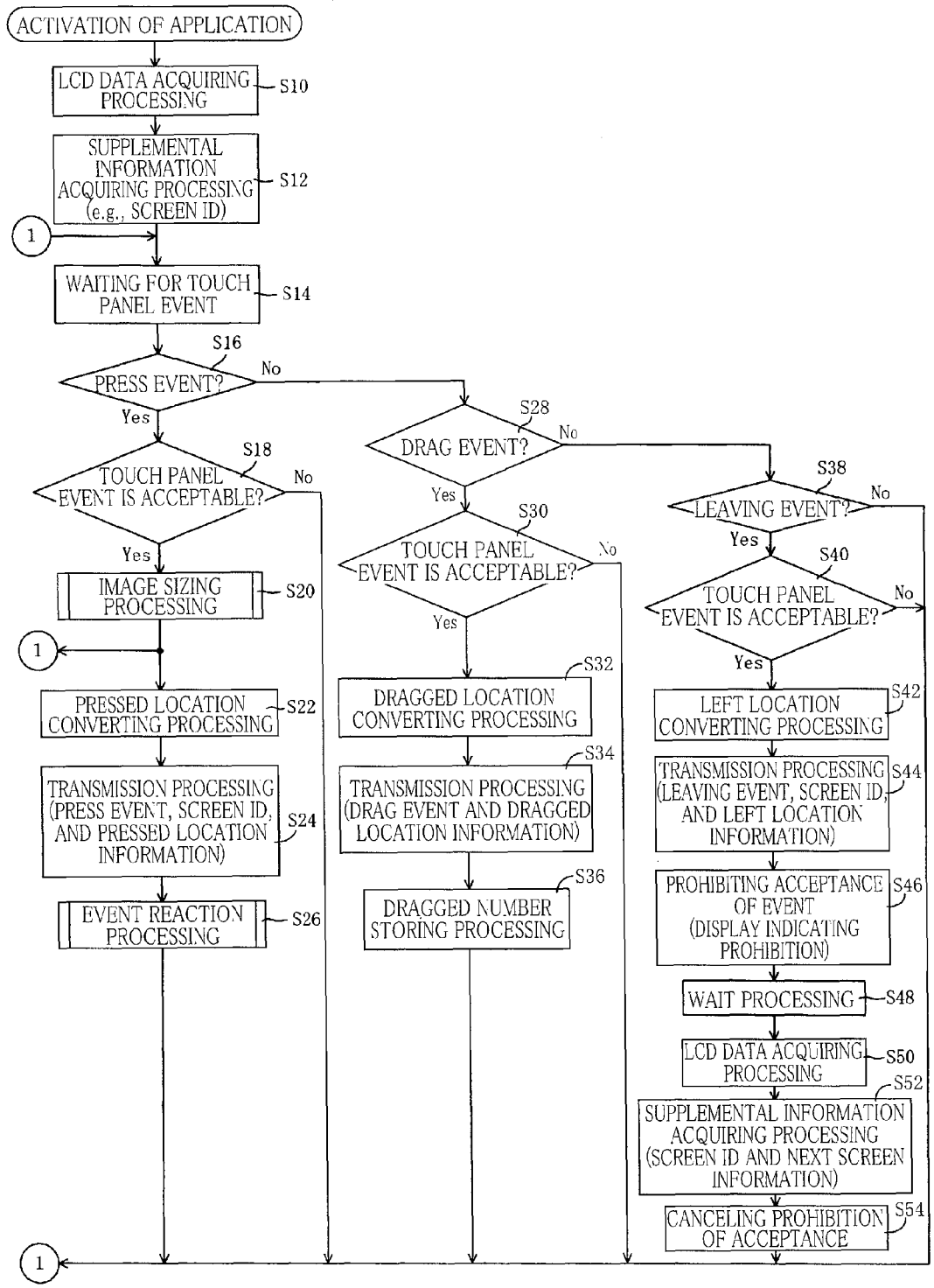
FIG. 4 is a flow chart illustrating a procedure of processings to be executed by the mobile terminal.

FIG. 4 illustrates a procedure of processings to be executed by the mobile terminal 40. The CPU 52 executes these processings by executing an operation support program stored in the flash memory 54. It is noted that processings at S14-S54 are executed each time when the CPU 52 at S14 accepts the input operation on the touch panel 46. That is, the processings at S14-S54 can be executed in parallel.

Figure 5:
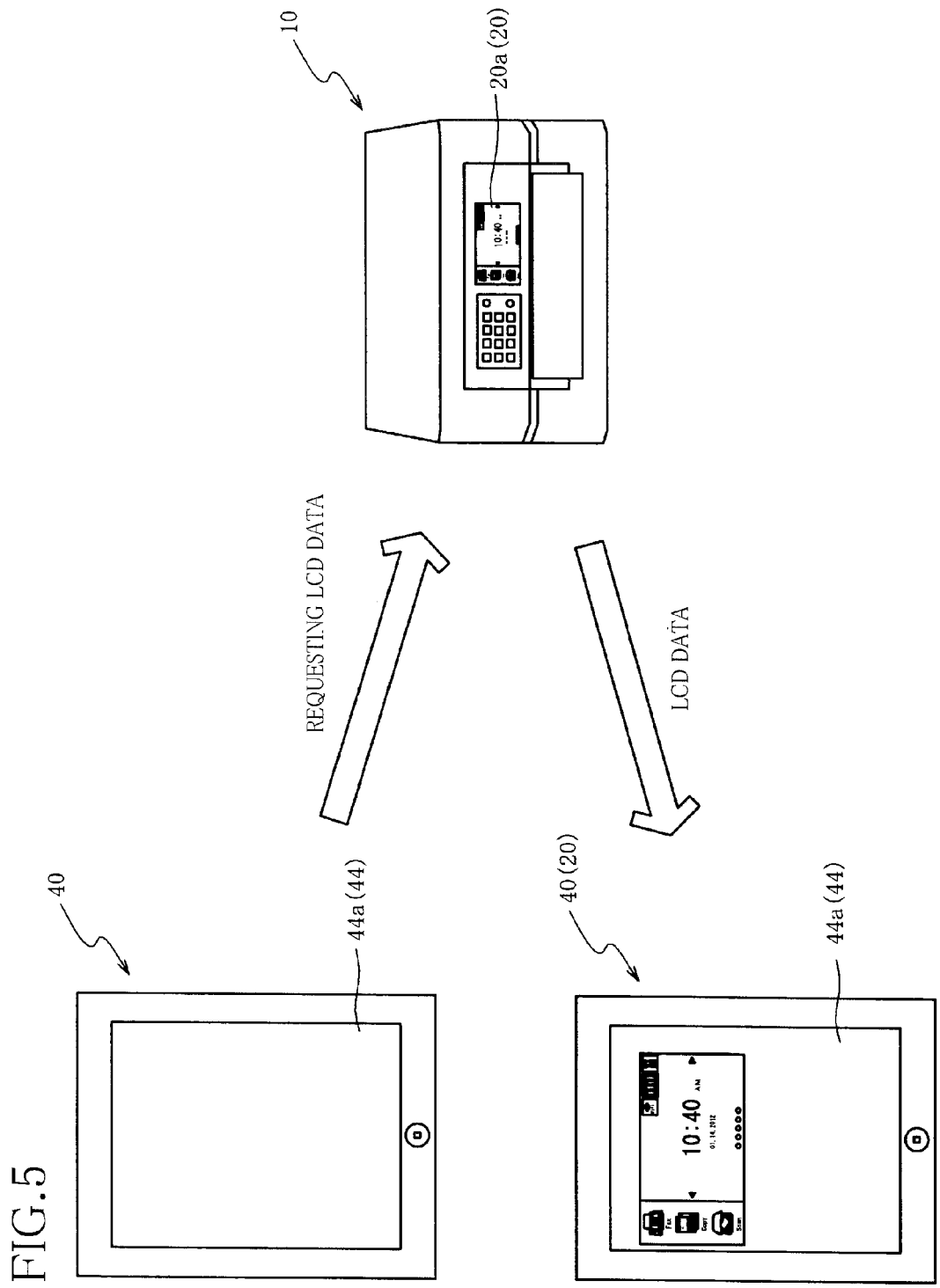
FIG. 5 is a view illustrating operations when an application is activated in the mobile terminal.

When the operation support program or application is activated, this flow begins with S10 at which the CPU 52 executes an LCD data acquiring processing. That is, the CPU 52 as illustrated in FIG. 5 sends the MFP 10 a signal for requesting the image data representative of the image displayed on the display region 20a of the LCD 20 of the MFP 10 (noted that this data may be hereinafter referred to as "LCD data"). When the MFP 10 transmits the LCD data to the mobile terminal 40, the CPU 52 receives the LCD data and displays an image on the display region 44a of the LCD 44 based on the LCD data.

The CPU 52 at S12 receives supplemental information from the MFP 10. Here, the supplemental information contains a screen ID for identifying the image requested at S10. The MFP 10 uses the image data map illustrated in FIG. 3 to incorporate a screen ID corresponding to the image data transmitted to the mobile terminal 40, into the supplemental information.

The CPU 52 at S14 waits for the input operation on the touch panel 46. When the CPU 52 accepts the input operation, the CPU 52 at S16 determines whether the input event relating to the input operation is a press event or not. When the input event is the press event (S16: Yes), the CPU 52 stores the location of the pressed instructed point into the RAM 56 and at S18 determines whether the input event on the touch panel 46 is acceptable or not. This processing is for determining whether a processing at S46 which will be described below is being executed or not. When the input event on the touch panel 46 is not acceptable (S18: No), this flow goes to S14 to accept the input event when the input operation on the touch panel 46 becomes acceptable. When the input event on the touch panel 46 is acceptable (S18: Yes), the CPU 52 executes an image sizing processing at S20.

Figure 6:
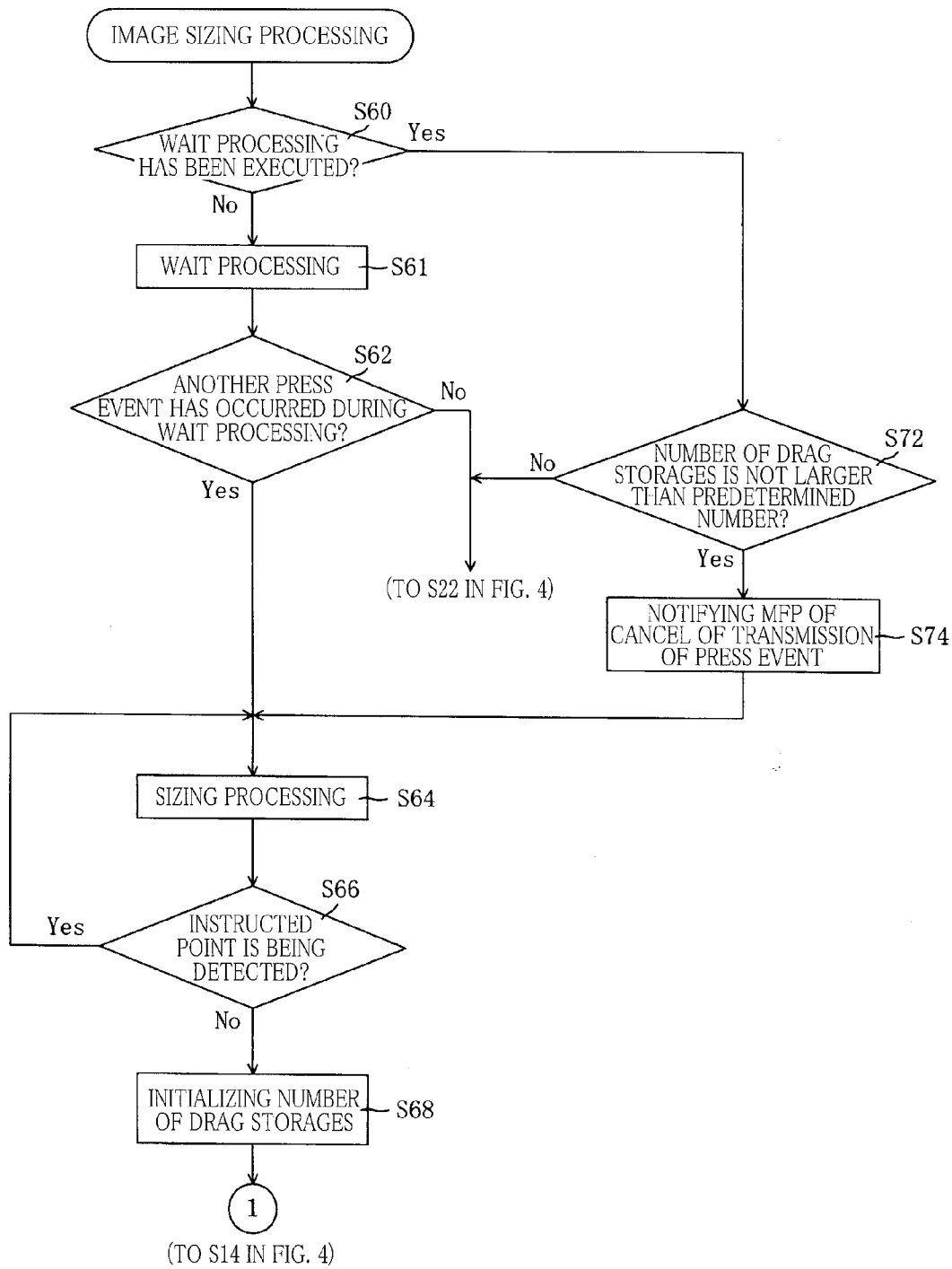
FIG. 6 is a flow chart illustrating a procedure of an image sizing processing.

FIG. 6 illustrates a procedure of the image sizing processing. This processing is for distinguishing whether the press event accepted at S14 is the press event for instructing the MFP 10 to execute the processing or one of successive press events accepted when a pinch-in operation or a pinch-out operation is performed using the input objects. Here, the pinch-in operation is an operation in which a thumb and an index finger, for example, touching the touch panel 46 are moved to each other, and this pinch-in operation is performed to reduce the size of the image. The pinch-out operation is an operation in which the thumb and the index finger, for example, touching the touch panel 46 are moved away from each other, and this pinch-out operation is performed to increase the size of the image. Since the pinch-in operation and the pinch-out operation are respectively for instructions of reducing and increasing the size of the image displayed on the image displayed on the display region 44*a* of the LCD 44 of the mobile terminal 40, the pinch-in operation and the pinch-out operation are not related to the MFP 10.

The CPU 52 at S60 determines whether a wait processing explained at S61 has been executed or not. When the wait processing has not been executed (S60: No), the CPU 52 at S61 starts the wait processing in which the CPU 52 waits for a predetermined length of time. Here, in a case where the user presses the touch panel 46 with two fingers as the input objects to perform the pinch-in operation or the pinch-out operation, the predetermined length of time is set according to a difference in time between a pair of pressing timings. Specifically, the predetermined length of time is set at a value normally taken as the above-described difference in time. For example, the predetermined length of time is set at 0.5 seconds in the present embodiment. The CPU 52 at S62 determines whether another press event has occurred during the wait processing or not. This processing is for determining whether or not the pinch-in operation or the pinch-out operation is to be performed. When another press event has occurred during the wait processing (S62: Yes), the CPU 52 at S64 executes a processing for increasing or reducing the size of the image displayed on the display region 44*a* of the LCD 44, according to movement of a pair of instructed points corresponding to the pair of press events. In reality, the processing at S62 is not preferably executed after waiting for the predetermined length of time, and the processing at S62 is preferably repeated until a positive decision is made before the predetermined length of time has passed. With this configuration, when a positive decision is made at S62, this flow can speedily go to S64.

When another press event has not occurred during the wait processing (S62: No), this flow goes to S22 in FIG. 4.

When a positive decision is made again at S16 in FIG. 4 by a touch or approach of another input object on or toward the touch panel 22, and the flow goes to the image sizing processing before a leaving event has occurred, the CPU 52 determines that the wait processing at S61 is being executed (S60: Yes), and the flow goes to S72. There are two instructed points at this time, and accordingly the user may intend to perform the pinch-in operation or the pinch-out operation. However, since two instructed points are established during the wait processing, the CPU 52 at S72 distinguishes whether the input operation is the pinch-in operation or the pinch-out operation, or an accidental press of the touch panel 46 with another finger during a drag.

Specifically, the CPU 52 at S72 determines whether or not the number of storages of drags which is incremented at S36 which will be described below is smaller than or equal to a predetermined number. The number of storages of drags indicates the number of samplings in a case where the drag operation is being performed and indicates that a length of time of the drag is longer with increase in the number of storages of drags. Here, the predetermined number is set at a value that is difficult to assume in the case of the pinch-in operation or the pinch-out operation. When the number of storages of drags is larger than the predetermined number (S72: No), the CPU 52 determines that the length of time of the drag operation is too long for the pinch-in operation or the pinch-out operation, and this flow goes to S22 in FIG. 4. When the number of storages of drags is smaller than or equal to the predetermined number (S72: Yes), the CPU 52 at S74 notifies the MFP 10 of a cancel of transmission of the press event since it is considered that the pinch-in operation or the pinch-out operation is to be performed. This cancel is performed because when the positive decision is made at S72, the user has intended to perform the pinch-in operation or the pinch-out operation, but it has taken a relatively long time from detection of one instructed point on the touch panel 46 to detection of another one instructed point on the touch panel 46, and accordingly the negative decision is made at S62, and after the processing at S22 which will be described below, the press event has been transmitted to the MFP 10 at S24 which will be described below. This canceling processing is a precondition to the processing at S160 in FIG. 9 which will be described below. Upon completion of the processing at S74, the CPU 52 at S64 executes the sizing processing according to movement of the pair of instructed points.

After the execution of the processing at S64, the CPU 52 at S66 determines whether the touch panel 46 has ceased detecting all the instructed points or not. In other words, the CPU 52 determines whether all the input objects have left the touch panel 22 or not. When the touch panel 46 has ceased detecting all the instructed points (S66: No), the CPU 52 at S68 initialize the number of storages of drags, and this flow returns to S14 in FIG. 4 to wait for a new input on the touch panel 46. In reality, the number of storages of drags at S68 changes to the initialized value in a case where the CPU 52 executes the processing at S74, and when the positive decision is made at S62, the CPU 52 does not need to execute the processing at S68.

Figure 7A:
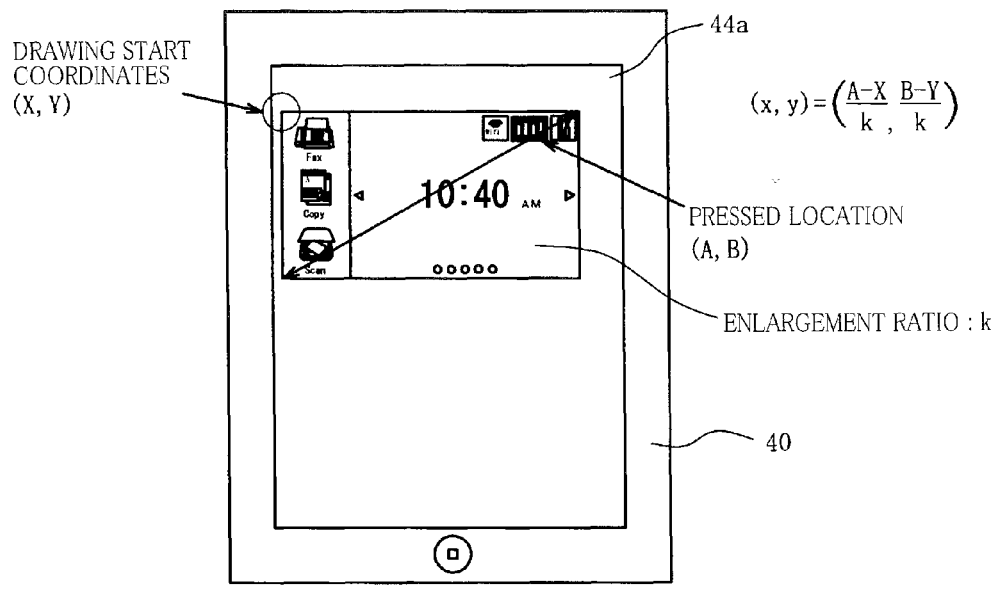
FIGS. 7A and 7B are views illustrating a processing for producing coordinate information.

When the processing at S20 in FIG. 4 is completed, that is, when a negative decision is made at S62 or S72, the CPU 52 at S22 converts a pressed location. For example, as illustrated in FIG. 7A, the CPU 52 obtains a value {(A−X)/k, (B−Y)/k} by dividing a difference (A−X, B−Y) between coordinates (drawing start coordinates: X, Y) on the display region 44*a* of the LCD 44 which are used as a reference for display of an image and coordinates (A, B) of the pressed point, by an enlargement ratio k of the image being displayed. The difference (A−X, B−Y) is coordinates of the pressed point provided in a case where the drawing start coordinates (X, Y) are designated as an origin point. Here, the enlargement ratio k is a ratio of the size of the image displayed on the display region 44*a* of the LCD 44 of the mobile terminal 40 to the size of the image displayed on the display region 20*a* of the LCD 20 of the MFP 10. It is noted that the size is not limited to the actual length and may be the number of pixels or screen resolutions, for example. In this case, in a case where the area of each pixel is smaller on the LCD 44 of the mobile terminal 40 than on the LCD 20 of the MFP 10, for example, even where the enlargement ratio is one, the actual size of the image displayed is smaller on the LCD 44 than on the LCD 20.

Figure 7B:
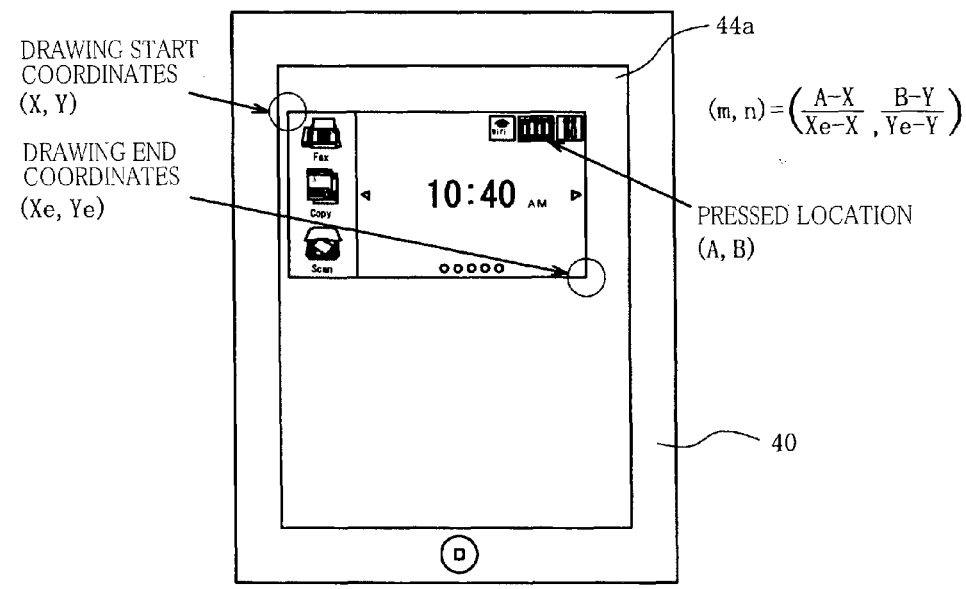

The converting processing is for allowing the MFP 10 to recognize which point on the image displayed on the display region 20a of the LCD 20 is the pressed point, even in the case where the enlarged or reduced-size image is being displayed on the display region 44a of the LCD 44 of the mobile terminal 40. This function of the converting processing is achieved also based on, as illustrated in FIG. 7B, a ratio of the length from the reference point to the pressed point to the length of the image on each component of the two-dimensional coordinates. That is, a pair of end portions of a diagonal line on the image may be respectively defined as the drawing start coordinates (X, Y) and drawing end coordinates (Xe, Ye), and the function of the converting processing may be achieved based on a ratio {(A−X)/(Xe−X), (B−Y)/(Ye−Y)} between the length of the displayed image and the length from the drawing start coordinates to the pressed point on each component of the two-dimensional coordinates.

At S24 in FIG. 4, the CPU 52 sends the MFP 10 pressed location information obtained by the above-described processing (i.e., coordinate information about the point instructed by a press), information indicating that the type of the input event is the press event, and the screen ID of the image being displayed on the display region 44a of the LCD 44. The CPU 52 at S26 executes an event reaction processing.

Figure 8:
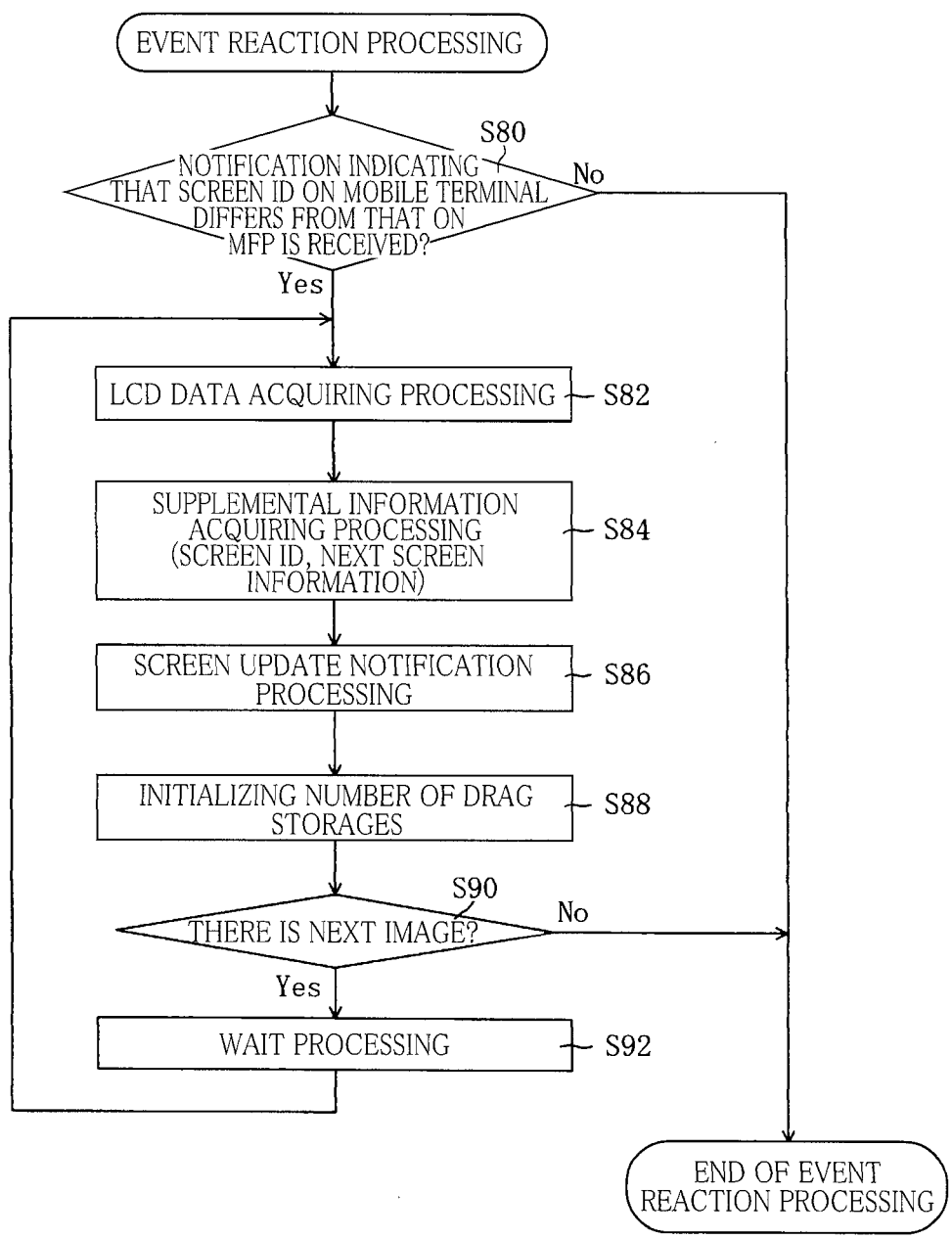
FIG. 8 is a flow chart illustrating a procedure of an event reaction processing.

FIG. 8 illustrates this event reaction processing. In this event reaction processing, the CPU 52 at S80 determines whether the CPU 52 has received, from the MFP 10, a notification indicating that the screen ID of the image displayed on the display region 44a of the LCD 44 of the mobile terminal 40 differs from the screen ID of the image displayed on the display region 20a of the LCD 20 of the MFP 10. This notification is transmitted in a processing at S140 in FIG. 9 (which will be described below) executed by the MFP 10 according the processing at S24 in FIG. 4. Here, the image displayed on the display region 20a of the LCD 20 of the MFP 10 is not changed by transmission of the press event to the MFP 10 in response to a press operation on the touch panel 46 of the mobile terminal 40. This is because, as described above, the screen is changed by the operation for confirming the instructed point (i.e., the leaving operation) in the present embodiment. The screen IDs may differ from each other nonetheless because in the case where the information which should be notified to the user is generated in the MFP 10, the image displayed on the display region 20a of the LCD 20 is switched independently of an input operation performed by the user as described above.

When the notification is not received for a predetermined length of time (S80: No), the event reaction processing ends. When the notification is not received (S80: Yes), the CPU 52 at S82 determines that there is LCD data to be acquired from the MFP 10 and executes the LCD data acquiring processing. This processing is similar to the processing at S10 in FIG. 4. The CPU 52 at S84 executes a supplemental information acquiring processing. This processing is generally similar to the processing at S12 in FIG. 4, but the CPU 52 at S84 acquires not only the screen ID but also next screen presence/absence information. The CPU 52 at S86 displays, on the display region 44a of the LCD 44, an image indicating that a screen is to be updated because the screen IDs are different. One example of this notification is a pop-up display. This processing is executed to notify the user of a switch of the screen which is caused because the image displayed on the display region 20a of the LCD 20 of the MFP 10 differs from the image displayed on the display region 44a of the LCD 44 of the mobile terminal 40.

The CPU 52 at S88 initializes the number of storages of drags which will be described below. At S90, the CPU 52 determines, based on the supplemental information received at S84, whether there is a next image to be acquired from the MFP 10 (hereinafter may be simply referred to as "next image") or not. This processing is on the precondition of a setting in which when an image displayed on the display region 20a of the LCD 20 has been changed in the MFP 10 independently of the mobile terminal 40, the mobile terminal 40 successively receives image data respectively representative of a plurality of images, and when these images should be displayed on the display region 44a of the LCD 44, information indicating the presence of the next image is incorporated into the supplemental information. It is noted that this setting will be explained later in detail at processings at S114-S122 in FIG. 9 which will be described below. When there is no next image (S90: No), the event reaction processing ends. When there is a next image (S90: Yes), the CPU 52 at S92 executes the wait processing, and this flow returns to S82. Here, a waiting time in the wait processing is set at a time that is long enough for the user to recognize the image being displayed on the display region 44a of the LCD 44.

It is noted that when the event reaction processing ends, this flow returns to S14 in FIG. 4 to wait for a new input operation on the touch panel 46.

When the newly occurred event is not the press event (S16: No), the CPU 52 at S28 determines whether the newly occurred event is the drag event or not. When the CPU 52 determines that the newly occurred event is the drag event, based on detection of a displacement of the instructed point on the touch panel 46 (S28: Yes), the CPU 52 at S30 determines whether the input event on the touch panel 46 is acceptable or not as in the processing at S18. When the input event on the touch panel 46 is not acceptable (S30: No), this flow returns to S14 to accept the input event on the touch panel 46 in a case where the input event becomes acceptable. When the input event on the touch panel 46 is acceptable (S30: Yes), the CPU 52 at S32 executes a dragged location converting processing. This processing is for converting the current location of the instructed point, to a value or coordinate information that can be identified as a location on the image displayed on the display region 20a of the LCD 20 of the MFP 10, in the manner similar to that illustrated in FIG. 7A or 7B, regardless of the size of the image displayed on the display region 44a of the LCD 44.

The CPU 52 at S34 sends the MFP 10 (i) information indicating that the type of the newly occurred event is a drag (i.e., the drag event) and (ii) coordinate information about the instructed point which is obtained at S32. The CPU 52 at S36 executes a processing for storing, into the RAM 56, the number of drag events which indicates the number of samplings of the dragged locations at S32. This processing is a precondition to the processing at S72 in FIG. 6. When the processing at S36 ends, this flow returns to S14 to wait for a new input operation on the touch panel 46.

When the newly occurred event is not the drag event (S28: No), the CPU 52 at S38 determines whether the newly occurred event is the leaving event or not. When the newly occurred event is not the leaving event (S38: No), this flow returns to S14 to wait for a new input operation on the touch panel 46. When the newly occurred event is the leaving event (S38: Yes), the CPU 52 at S40 determines whether the input event on the touch panel 46 is acceptable or not as in the processing at S18. When the input event on the touch panel 46 is not acceptable (S40: No), this flow returns to S14 to accept the input event on the touch panel 46 in a case where the input event becomes acceptable. When the input event on the touch panel 46 is acceptable (S40: Yes), the CPU 52 at S42 executes a left location converting processing. This processing is for converting a location at which the instructed point has disappeared, in other words, the location of the instructed point detected most recently (the pressed location or the dragged location), to a value that can be identified as a location on the image displayed on the display region 20a of the LCD 20 of the MFP 10, in the manner similar to that illustrated in FIG. 7A or 7B, regardless of the size of the image displayed on the display region 44a of the LCD 44.

The CPU 52 at S44 sends the MFP 10 (i) information indicating that the type of the newly occurred event is leaving, (ii) the screen ID of the image displayed on the LCD 44, and (iii) left location information obtained at S42 (i.e., coordinate information about the instructed point having disappeared upon leaving). The CPU 52 at S46 starts prohibiting an acceptance of the event and at S48 executes the wait processing. Upon completion of the wait processing, the CPU 52 at S50 executes an LCD data acquiring processing similar to the processing at S10 and at S52 executes a supplemental information acquiring processing similar to the processing at S12. It is noted that the CPU 52 at S52 acquires not only the screen ID but also the next screen presence/absence information. The wait processing is a processing in which the CPU 52 waits for transmission of a LCD-data requesting signal for a length of time required for the image displayed on the display region 20a of the LCD 20 of the MFP 10 to be switched in response to the leaving event. This wait processing is on the precondition that the animation display is performed in the case where the image to be displayed on the display region 20a of the LCD 20 is switched in the present embodiment as explained above with reference to FIGS. 2A-2C.

If the mobile terminal 40 requests the MFP 10 to transmit the LCD data within a period of the animation display, the image displayed on the MFP 10 and the image displayed on the mobile terminal 40 may unfortunately differ from each other, and if the input operation is received in this case, a malfunction may occur in the MFP 10. That is, the LCD data during the animation is transmitted to the mobile terminal 40, and when a switch of the image displayed on the display region 20a of the LCD 20 of the MFP 10 is finished within a period in which an image based on the data is displayed on the display region 44a of the LCD 44, the input operation on the touch panel 22 is allowed in the MFP 10 at this time. If the input operation on the touch panel 46 is performed on the mobile terminal 40 at this time based on the image illustrated in FIG. 2B and displayed on the display region 44a of the LCD 44, and coordinate information about the instructed point is transmitted to the MFP 10, the MFP 10 may erroneously recognize that the input operation is performed on the image displayed on the display region 20a of the LCD 20 at a location that differs from a location intended by the user. If the instructed point erroneously recognized is located on the display region 20a of the LCD 20 at an object indicating a location at which an instructed point should be positioned for instructing the processing to be executed by the MFP 10, a malfunction may occur in the MFP 10. To prevent this problem, the touch panel 46 of the mobile terminal 40 does not accept the input operation thereon within the period of the animation display on the MFP 10 in the processings at S46 and S54 in FIG. 4.

Upon completion of the processing at S52, the CPU 52 at S54 cancels or finishes the processing for prohibiting the acceptance of the event, and this flow returns to S14 to wait for a new input operation on the touch panel 46. It is noted that the reason why this processing is not executed at the completion of the processing at S48 is for canceling the acceptance prohibiting processing on condition that the image displayed on the display region 44a of the LCD 44 is switched to the image displayed on the display region 20a of the LCD 20.

Figure 9:
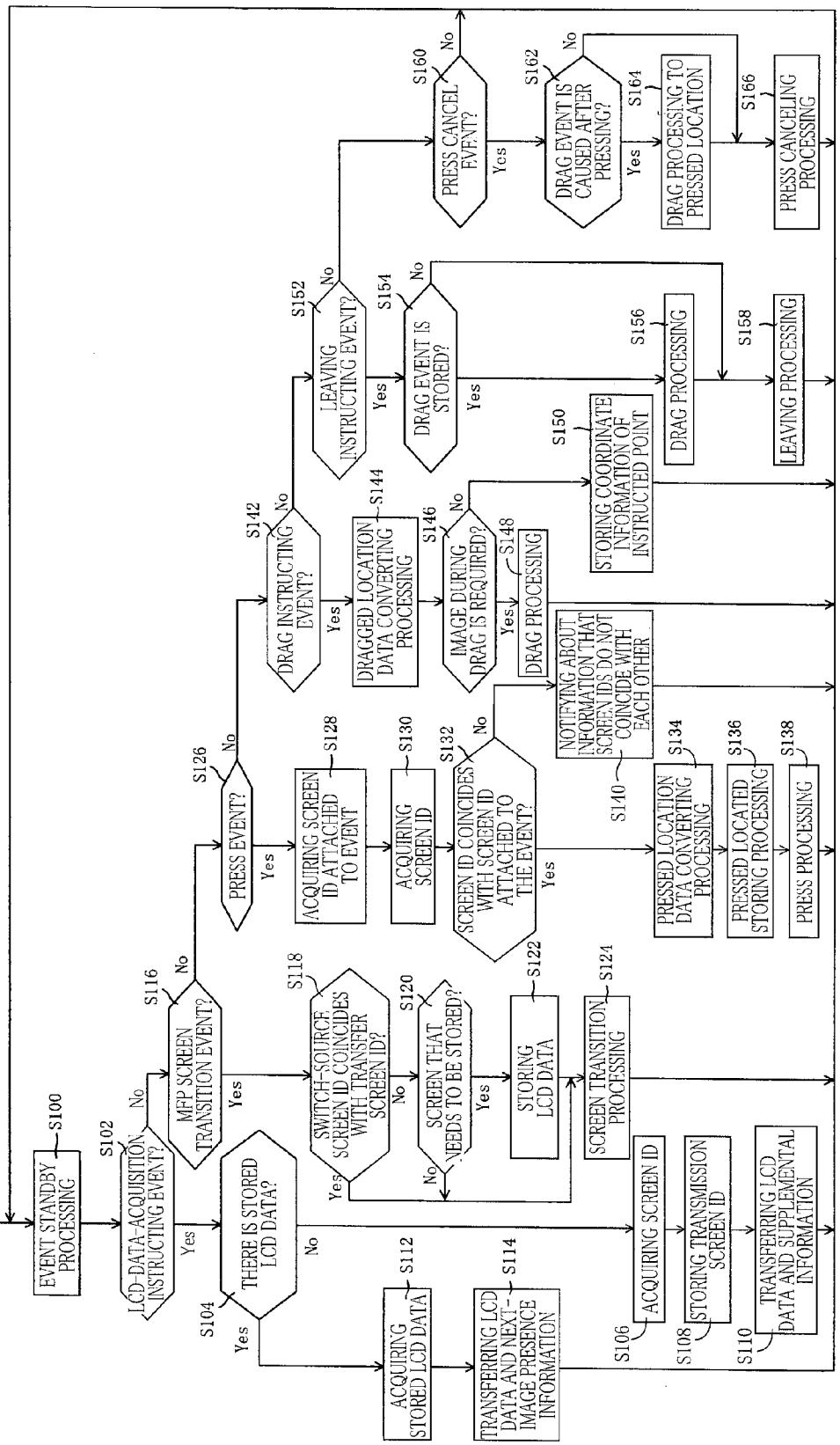
FIG. 9 is a flow chart illustrating a procedure of processings to be executed by the MFP.

FIG. 9 illustrates a procedure of processings to be executed by the MFP 10. These processings are executed by the CPU 12 of the MFP 10.

This flow begins with S100 at which the CPU 12 executes an event standby processing for waiting for transmission of information such as the type of event and the coordinate information from the mobile terminal 40. When an event occurs, the CPU 12 at S102 determines whether the event is a request for the LCD data or not. When the event is the request for the LCD data (S102: Yes), the CPU 12 at S104 determines whether there is LCD data stored in the RAM 16 or not. This processing is provided in view of the above-described situation in which when the information which should be notified to the user is generated in the MFP 10, the image displayed on the display region 20a of the LCD 20 of the MFP 10 may be switched regardless of the input operation performed on the touch panel 46 of the mobile terminal 40. That is, since image data not having been transmitted to the mobile terminal 40 yet is stored into the RAM 16 in this case at a processing at S122 which will be described below, the CPU 12 at S104 determines whether or not there is image data stored in the RAM 16 independently of the image data representative of the image being displayed on the display region 20a of the LCD 20. When there is no LCD data stored in the RAM 16 (S104: No), the CPU 12 at S106 acquires a screen ID that is an ID assigned to the image data displayed on the display region 20a of the LCD 20. This processing can be executed based on the image data map illustrated in FIG. 3. The CPU 12 at S108 stores the acquired screen ID into the RAM 16 as a transfer screen ID to be transmitted to the mobile terminal 40. The CPU 12 at S110 transfers the LCD data and the transfer screen ID as the supplemental information to the mobile terminal 40. In reality, the processing for transferring the supplemental information is executed when the supplemental information is requested by the mobile terminal 40 at S12, S52, or S84 in FIGS. 4 and 8 independently of the request for the LCD data.

When the event is not the LCD-data-acquisition instructing event (S102: No), the CPU 12 at S116 determines whether an event of a transition of the screen displayed on the LCD 20 has occurred or not. This processing is for determining whether or not the event of the transition of the screen displayed on the LCD 20 has occurred despite the absence of the instruction from the mobile terminal 40. One example of the screen transition in this case is a pop-up display which is caused when the information which should be notified to the user is generated in the MFP 10 as described above. Here, the screen ID assigned to an image corresponding to the pop-up display differs from the screen ID assigned to an image not corresponding to the pop-up display in the image data map illustrated in FIG. 3.

When the screen transition event has occurred (S116: Yes), the CPU 12 at S118 determines whether or not the screen ID of the image displayed before the switch coincides with or matches the transfer screen ID stored at S108. This processing is for determining whether or not the image displayed before the switch has not been transferred to the mobile terminal 40 yet. When the screen ID of the image displayed before the switch does not coincide with the transfer screen ID (S118: No), the CPU 12 at S120 determines whether or not the image displayed before the switch is a screen that needs to be stored. This processing is executed with reference to the image data map illustrated in FIG. 3. That is, the need for the storage is defined in advance in the image data map, and accordingly the CPU 12 determines whether the CPU 12 needs to store image data representative of the image or not based on the image data map. When the CPU 12 needs to store the image data representative of the image (S120: Yes), the CPU 12 at S122 stores the LCD data into the RAM 16. When the screen ID of the image displayed before the switch coincides with the transfer screen ID after the storage of the LCD data or at S118 (S118: Yes) or when the image displayed before the switch is not a screen that needs to be stored (S120: No), the CPU 12 at S124 executes a processing for screen transition, and this flow goes to S100 to wait for a new event.

When the CPU 12 at S104 determines that there is any LCD data stored in the RAM 16 (S104: Yes), the CPU 12 at S112 acquires the LCD data stored in the RAM 16. The CPU 12 at S114 transfers the LCD data and the supplemental information, and this flow returns to S100 to wait for a new event. Here, the supplemental information contains information indicating that there is a next image. This is a setting for causing the mobile terminal 40 to transmit a signal requesting for the LCD data again. That is, in the present embodiment, the MFP 10 transfers the LCD data to the mobile terminal 40 in response to the request for the LCD data from the mobile terminal 40, and the MFP 10 never transfers the LCD data to the mobile terminal 40 without receiving the request. Here, the situation in which there is LCD data stored in the RAM 16 is a situation in which the negative decision is made at S118, and the positive decision is made at S120, and this situation cannot be recognized by the mobile terminal 40. Accordingly, the supplemental information contains the information indicating that there is the next image. Consequently, when the positive decision is made at S90 in FIG. 8, the CPU 52 at S82 requests the LCD data again.

When the newly occurred event is not the screen transition (S116: No), the CPU 12 at S126 determines whether the newly occurred event is the press event or not. When the newly occurred event is the press event (S126: Yes), the CPU 12 at S128 acquires or receives a screen ID attached to the event. This processing is on the precondition of the processing at S24 in FIG. 4. The CPU 12 at S130 acquires the screen ID of the image displayed on the display region 20*a* of the LCD 20. The CPU 12 at S132 determines whether the acquired screen ID attached to the event coincides with the screen ID of the image displayed on the display region 20*a* of the LCD 20 or not. This processing is for determining whether the image displayed on the display region 20*a* of the LCD 20 of the MFP 10 coincides with the image displayed on the display region 44*a* of the LCD 44 of the mobile terminal 40 or not. When the acquired screen ID attached to the event coincides with the screen ID of the image displayed on the display region 20*a* of the LCD 20 (S132: Yes), the CPU 12 determines that the press event transmitted from the mobile terminal 40 is effective as the instruction for causing the MFP 10 to execute a processing corresponding to the press event, and the CPU 12 executes processings at S134-S138. That is, the CPU 12 at S134 converts pressed location data if necessary.

The CPU 12 at S136 stores the pressed location into the RAM 16. This processing is a precondition to a processing at S164 which will be described below. The CPU 12 at S138 executes a press processing which is a processing to be executed in response to the pressing, and this flow returns to S100 to wait for a new event. In a case where there is an object at a pressed location, for example, this processing creates a display for visually indicating that the object has been chosen. It is noted that this processing may cause a processing only inside the MFP 10 without causing any changes to the display region 20*a* of the LCD 20.

When the CPU 12 at S132 determines that the acquired screen ID attached to the event does not coincide with the screen ID of the image displayed on the display region 20*a* of the LCD 20 (S132: No), the CPU 12 at S140 notifies of the mobile terminal 40 about information indicating that the screen IDs do not coincide with each other, and this flow returns to S100 to wait for a new event. The processing at S140 is a precondition to the processing at S80 in FIG. 8. When the negative decision is made at S132, the CPU 12 does not execute the press processing at S138. This is because, when the image displayed on the display region 20*a* of the LCD 20 of the MFP 10 is not the same as the image displayed on the display region 44*a* of the LCD 44 of the mobile terminal 40, it is considered that the press event transmitted from the mobile terminal 40 is not effective as the instruction for causing the MFP 10 to execute a processing corresponding to the press event.

When the newly occurred event is not the press event (S126: No), the CPU 12 at S142 determines whether the newly occurred event is a drag instructing event or not. When the newly occurred event is the drag instructing event (S142: Yes), the CPU 12 at S144 converts dragged location data, if necessary, in the manner similar to the processing at S134. The CPU 12 at S146 determines whether or not the CPU 12 needs to control the LCD 20 of the MFP 10 to cause a display based on the drag, e.g., a display for moving the dragged image, in response to the drag operation on the touch panel 46 of the mobile terminal 40. The CPU 12 can execute this processing by storing values into, e.g., the flash memory 54 of the MFP 10 in advance, and each of these values determines whether the CPU 12 needs to control the LCD 20 to cause a display based on the drag or not. It is noted that the requirement of the display based on the drag may be determined at shipment of the MFP 10 and may be selectable by the user. When the image during the drag is required (S146: Yes), the CPU 12 at S148 controls the LCD 20 of the MFP 10 to cause a display based on the drag in response to the drag operation on the touch panel 46 of the mobile terminal 40. When the image during the drag is not required (S146: No), the CPU 12 at S150 stores, into the RAM 16, the current instructed point moved after the drag, this flow returns to S100 to wait for a new event.

When the newly occurred event is not the drag instructing event (S142: No), the CPU 12 at S152 determines whether the drag instructing event is a leaving instructing event or not. When the drag instructing event is the leaving instructing event (S152: Yes), the CPU 12 at S154 determines whether the location of the instructed point changed by the drag from the instructed point at the pressing is stored at S150 or not. When the changed location of the instructed point is stored (S154: Yes), the CPU 12 at S156 displaces the instructed point to the stored location on the display region 20*a* of the LCD 20. When this processing is completed or when the changed location of the instructed point is not stored (S154: No), the CPU 12 executes a leaving processing at S158, and this flow returns to S100 to wait for a new event. It is noted that the leaving processing is executed on the MFP 10 in response to the leaving operation performed on the touch panel 46 of the mobile terminal 40. For example, in a case where the leaving operation is performed on an object displayed on the display region 44a of the LCD 44 of the mobile terminal 40, and thereby the choice of the object is confirmed, a display based on this operation is caused on the display region 20a of the LCD 20 of the MFP 10.

When the newly occurred event is not the leaving instructing event (S152: No), the CPU 12 at S160 determines whether or not the newly occurred event is a press cancel event transmitted at S74 in FIG. 6. When the newly occurred event is not the press cancel event (S160: No), this flow returns to S100 to wait for a new event. When the newly occurred event is the press cancel event (S160: Yes), the CPU 12 at S162 determines whether or not a drag event has occurred just after the pressing operation. When the drag event has occurred (S162: Yes), the CPU 12 at S164 returns, to the pressed location, the location of the instructed point on the LCD 20 and the location of the object displaced in response to the drag event. This processing is executed because the location of the displayed object is moved back to the pressed location in the case where the location of the displayed object chosen by the press is changed by the drag operation continued after the press, and thereafter the press event is canceled. When this processing is completed or when the drag event has not occurred (S162: No), the CPU 12 executes a press canceling processing at S166, and this flow returns to S100 to wait for a new event. Here, in a case where the press processing is a display of information indicating that the pressed object is chosen, the display of the information is canceled in the press canceling processing, for example.

The present embodiment described above provides the following effects.

The image displayed on the display region 20a of the LCD 20 of the MFP 10 is displayed on the display region 44a of the LCD 44 of the mobile terminal 40. This configuration allows the user to perform the input operation on the touch panel 46 of the mobile terminal 40 in the same way as the user performs the input operation on the touch panel 22 of the MFP 10.

The coordinate information about the instructed point (i.e., (x, y) in FIG. 7A or (m, n) in FIG. 7B) determined based on the input operation performed on the touch panel 46 of the mobile terminal 40 is transmitted to the MFP 10 at S24, S34, or S44 in FIG. 4. This configuration eliminates a need for the mobile terminal 40 to recognize which processing of the MFP 10 is instructed by the input operation on the touch panel 46, thereby providing general versatility in the function for controlling the MFP 10 based on the input to the touch panel 46.

The screen ID is assigned to the image data (FIG. 3), and the mobile terminal 40 receives the screen ID upon receiving the LCD data and transmits the screen ID upon transmitting the coordinate information and so on to the MFP 10. This configuration allows the MFP 10 to recognize whether the image displayed on the display region 44a of the LCD 44 of the mobile terminal 40 matches the image displayed on the display region 20a of the LCD 20 of the MFP 10. Accordingly, the MFP 10 can deal with a mismatch.

When the image displayed on the display region 44a of the LCD 44 of the mobile terminal 40 does not match the image displayed on the display region 20a of the LCD 20 of the MFP 10 (S132: No), the mobile terminal 40 requests the LCD data at S82. This configuration can eliminate the mismatch.

When the image displayed on the display region 44a of the LCD 44 of the mobile terminal 40 does not match the image displayed on the display region 20a of the LCD 20 of the MFP 10 (S132: No), the mobile terminal 40 receives the LCD data from the MFP 10 to update the display and at S86 displays the information indicating that the image is updated to eliminate the mismatch. This configuration can notice the user of the situation.

The mobile terminal 40 requests and receives the supplemental information containing the screen ID, and the LCD data separately. With this configuration, in a state in which the mobile terminal 40 can convert the LCD data (e.g., PDF data) transmitted from the MFP 10, into, e.g., JPEG data in a state in which no data is attached to the LCD data. Accordingly, the mobile terminal 40 can convert the LCD data when compared with a case where the supplemental information and the LCD data are combined.

The mobile terminal 40 does not accept the input operation on the touch panel 46 until the mobile terminal 40 receives the requested LCD data and displays the image on the display region 44a of the LCD 44 based on the LCD data (specifically the processing at S14 is executed after the processing at S10 in FIG. 4, and the flow goes to S14 upon completion of the processing at S46-S54, or S26). As a result, the mobile terminal 40 does not accept the input operation on the touch panel 46 over a period in which the image displayed on the display region 44a of the LCD 44 of the mobile terminal 40 does not match the image displayed on the display region 20a of the LCD 20 of the MFP 10, reliably preventing occurrence of a situation in which the MFP 10 erroneously recognizes an instruction that differs from an instruction intended by the user.

The supplemental information contains the information about the presence or absence of the next image. As a result, the mobile terminal 40 can appropriately requests the LCD data in a setting in which the LCD data is transmitted from the MFP 10 to the mobile terminal 40 on condition that the mobile terminal 40 requests the LCD data.

The MFP 10 transmits the LCD data to the mobile terminal 40 on condition that the mobile terminal 40 has requested transmission of the LCD data. This configuration allows the MFP 10 to transmit the LCD data to the mobile terminal 40 at the timing when the mobile terminal 40 requires the LCD data. Even in a case where there are a plurality of mobile terminals 40 each configured to communicate with the MFP 10, the MFP 10 can transmit the LCD data appropriately to one of the mobile terminals 40 which requires the LCD data.

On condition that a screen transition is caused in the state in which the image data representative of the image displayed on the display region 20a of the LCD 20 of the MFP 10 has not been transmitted to the mobile terminal 40, the image data representative of the image before the screen transition is stored at S122 into the RAM 16. Accordingly, the MFP 10 can send the mobile terminal 40 the image data representative of the image displayed before the screen transition.

The mobile terminal 40 requests transmission of the LCD data at S50 in FIG. 4 when the leaving operation is performed on the touch panel 46 of the mobile terminal 40 and transmitted to the MFP 10 as the type of the input event. Here, the leaving operation is an operation for confirming the choice of the location on the image, and in response to the leaving operation, the image displayed on the display region 20a of the LCD 20 of the MFP 10 is switched in many cases. Thus, the mobile terminal 40 can request the LCD data at the appropriate timing.

The mobile terminal 40 is in the standby state for the predetermined length of time at S48 in FIG. 4 before requesting transmission of the LCD data in response to the leaving operation performed on the touch panel 46 of the mobile terminal 40. This configuration can avoid a situation in which before the switch of the image is completed on the MFP 10, the LCD data is transmitted to the mobile terminal 40 in response to the request for transmission of the LCD data.

The coordinate information (i.e., (x, y) in FIG. 7A and (m, n) in FIG. 7B) transmitted from the mobile terminal 40 to the MFP 10 contains standard-size positional information for identifying the location of the instructed point in a case where the image is of a standard size, regardless of whether the size of the image displayed on the display region 44*a* of the LCD 44 is increased or reduced. Accordingly, the MFP 10 can recognize which processing is instructed by the input operation performed on the touch panel 46 of the mobile terminal 40, regardless of whether the size of the image displayed on the display region 44*a* of the LCD 44 is increased or reduced.

The coordinate information to be transmitted from the mobile terminal 40 to the MFP 10 is combined with the standard-size positional information. This configuration can simplify the coordinate information to be transmitted from the mobile terminal 40 to the MFP 10.

In the case where there are a plurality of instructed points on the display region 44*a* of the LCD 44 of the mobile terminal 40, the mobile terminal 40 does not transmit the type of the input event and the coordinate information to the MFP 10, that is, in the case where the positive decision is made at S62 in FIG. 6. This configuration can avoid a situation in which unnecessary information is transmitted to the MFP 10.

In a case where the press event is detected and thereafter another press event occurs again before the leaving event corresponding to the detected press event, the mobile terminal 40 transfers the press cancel event to the MFP 10 at S74 in FIG. 6. This configuration can avoid a situation in which the MFP 10 reflects erroneous information about the input event in the case where the input operation performed on the touch panel 46 of the mobile terminal 40 is for instructing increase or reduction in the size of the image.

The mobile terminal 40 at S66 and S68 in FIG. 6 sets not to send the MFP 10 the leaving event caused after the transfer of the press cancel event at S74 in FIG. 6, preventing unnecessary input event information to be transmitted to the MFP 10.

In the case of reception of the press cancel event, the MFP 10 executes the canceling processing at S166 in FIG. 9. Accordingly, even in a case where the type of the input event transmitted from the MFP 10 is identified later as an inappropriate one, the MFP 10 can deal with this problem.

In the case where the press cancel event is received, and the drag event occurs after the press event to be canceled, the instructed point is moved at S164 in FIG. 9 back to the location at which the press event is caused. As a result, the object moved in response to the drag can be returned to the original location on the LCD 20 of the MFP 10. Accordingly, at the time when the press canceling processing (S166) is executed, the object can be displayed at the location at which the object is displayed before the press event.

<Second Embodiment>

There will be next explained a second embodiment with reference to drawings, focusing mainly on differences between the first embodiment and the second embodiment.

In the above-described first embodiment, in the case where the notification indicating that there is the next image is received from the MFP 10 when the mobile terminal 40 requests the MFP 10 to transmit the LCD data, even if the mobile terminal 40 does not detect an approach or touch of the input object on the touch panel 46, the mobile terminal 40 requests the next image and acquires the LCD data from the MFP 10 and displays an image on the display region 44*a* of the LCD 44 based on the acquired LCD data. In this second embodiment, in contrast, in the case where the notification indicating that there is the next image is received, the mobile terminal 40 asks for permission to display the next image in advance of display of the next image.

Figure 10:
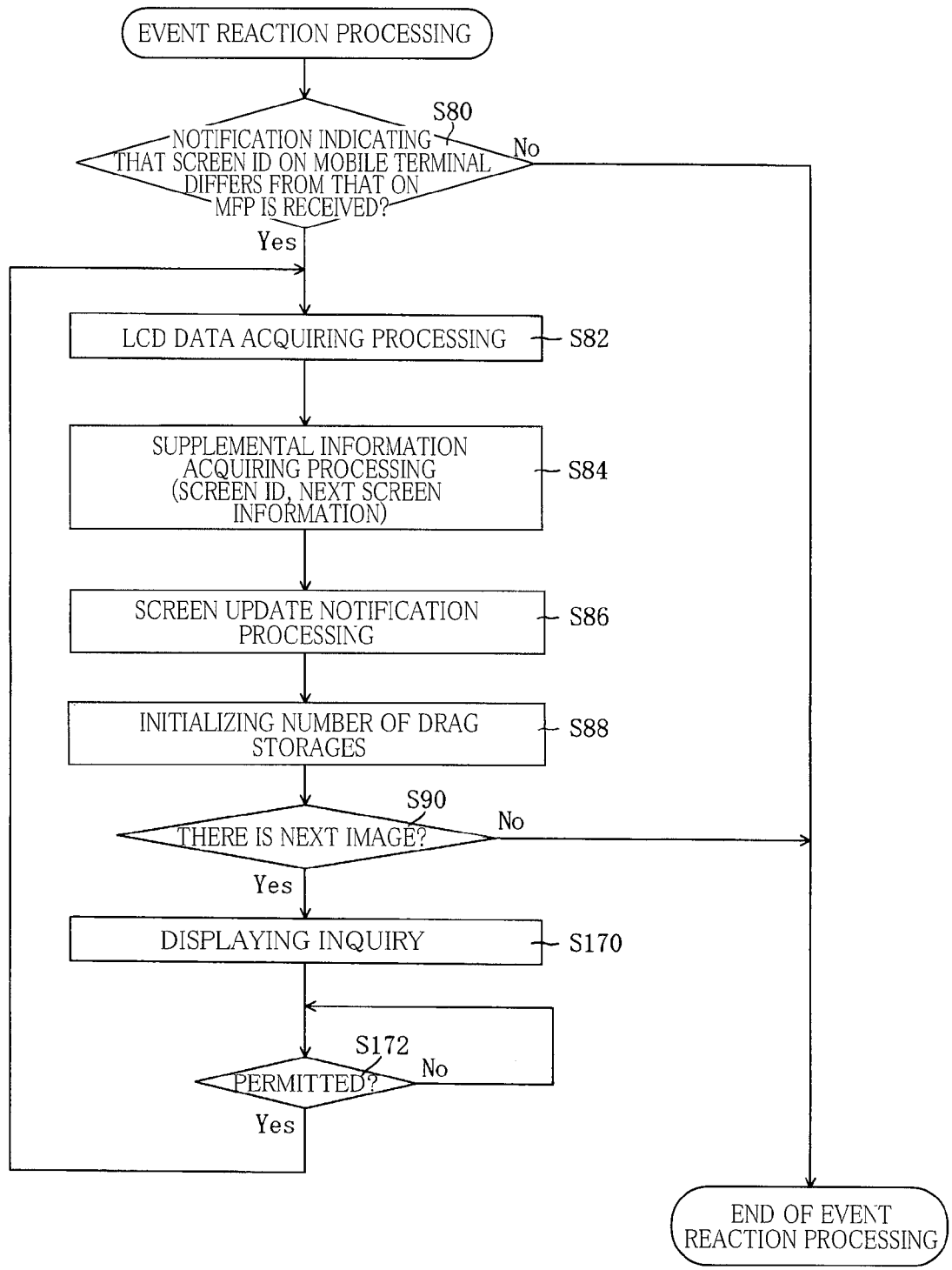
FIG. 10 is a flow chart illustrating a procedure of an event reaction processing in a second embodiment.

FIG. 10 illustrates a procedure of an event reaction processing in this second embodiment. The CPU 52 executes this processing by executing the operation support program stored in the flash memory 54 of the mobile terminal 40. It is noted that the same numerals as used in the flow chart in FIG. 8 are respectively used for the same processings as in the flow chart in FIG. 10.

When the CPU 52 at S90 determines that there is a next image, the CPU 52 at S170 controls the LCD 44 to display an image inquiring of the user as to whether the next image is to be requested or not. The CPU 52 at S172 determines whether the user as a result of the inquiry has permitted the request of the next image or not. The CPU 52 is in the standby state until the user permits the request of the next image (S172: No). When the user permits the request of the next image (S172: Yes), this flow goes to S82 for the LCD data acquiring processing.

The present embodiment described above provides the following effects in addition to the effects obtained in the first embodiment.

In the case where the mobile terminal 40 acquiring the LCD data has received the information indicating that there is the next image, as the supplemental information, the mobile terminal 40 inquires of the user as to whether re-request of the LCD data is permitted or not, and when the re-request is permitted, the mobile terminal 40 executes the LCD data acquiring processing again (S172: Yes). This configuration allows the mobile terminal 40 to execute the LCD data acquiring processing according to the intention of the user.

<Third Embodiment>

There will be next explained a third embodiment with reference to drawings, focusing mainly on differences between the first embodiment and the third embodiment.

In the above-described first embodiment, in view of the animation display caused when the image displayed on the LCD 20 of the MFP 10 is switched, the wait processing at S48 in FIG. 4 is executed in response to the leaving event on the mobile terminal 40. In this third embodiment, in contrast, when the mobile terminal 40 requests the MFP 10 to transmit the LCD data, and the MFP 10 executes the animation display, the MFP 10 does not transfer the LCD data to the mobile terminal 40 until the animation display is finished.

Figure 11:
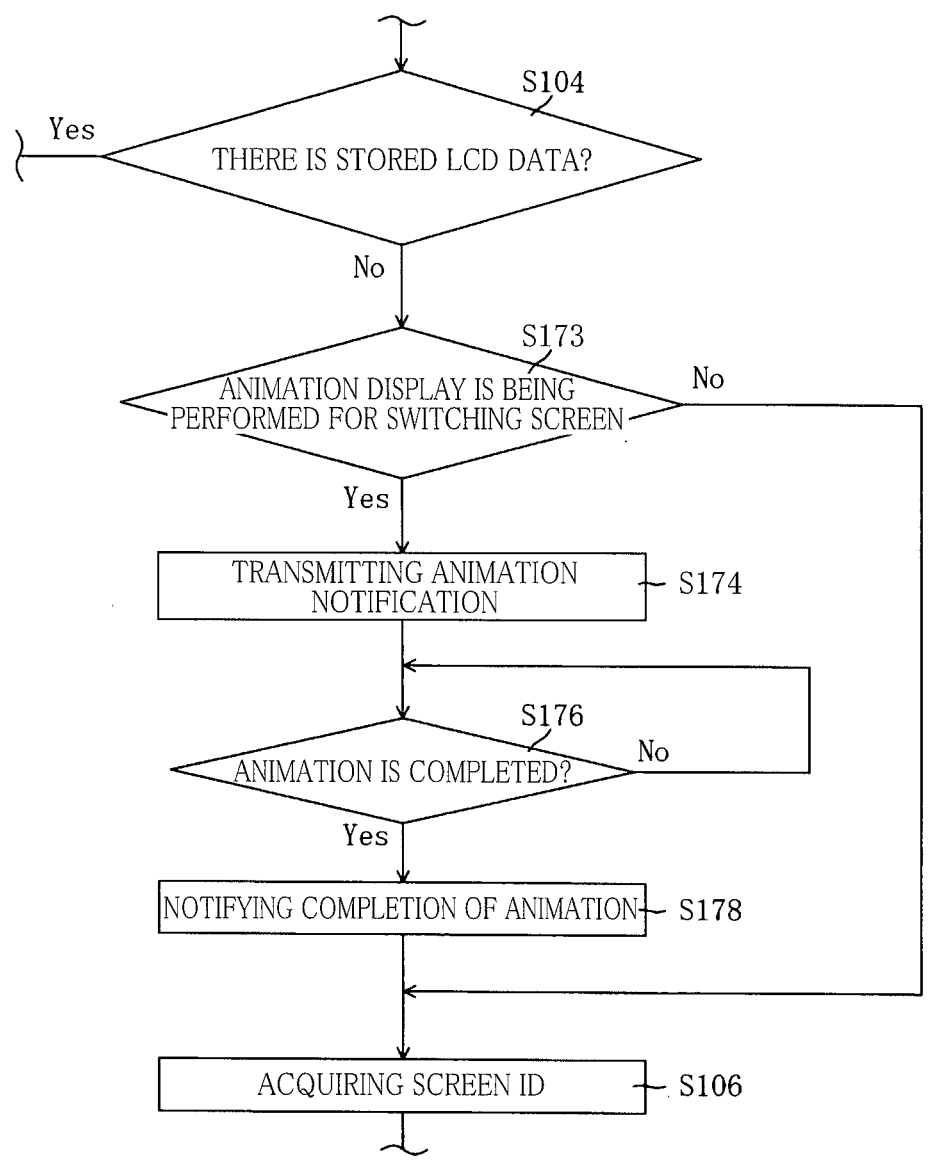
FIG. 11 is a flow chart illustrating a procedure of processings to be executed by the MFP in a third embodiment.

FIG. 11 illustrates a portion of a procedure of processings to be executed by the MFP 10 in this third embodiment, specifically, FIG. 11 illustrates changes from the processings illustrated in FIG. 9. These processings are executed by the CPU 12 of the MFP 10.

When there is no LCD data stored in the RAM 16 (S104: No), the CPU 12 at S173 determines whether the animation display is being performed or not for switching the image displayed on the display region 20*a* of the LCD 20. When the animation display is not being performed (S173: No), this flow goes to S106. When the animation display is being performed (S173: Yes), the CPU 12 at S174 sends the mobile terminal 40 an animation notification indicating that the animation display is being performed. The CPU 12 at S176 waits for the completion of the animation display. When the animation display is completed (S176: Yes), the CPU 12 at S178 notifies the mobile terminal 40 of the information indicating the completion of the animation, and this flow goes to S106.

Figure 12:
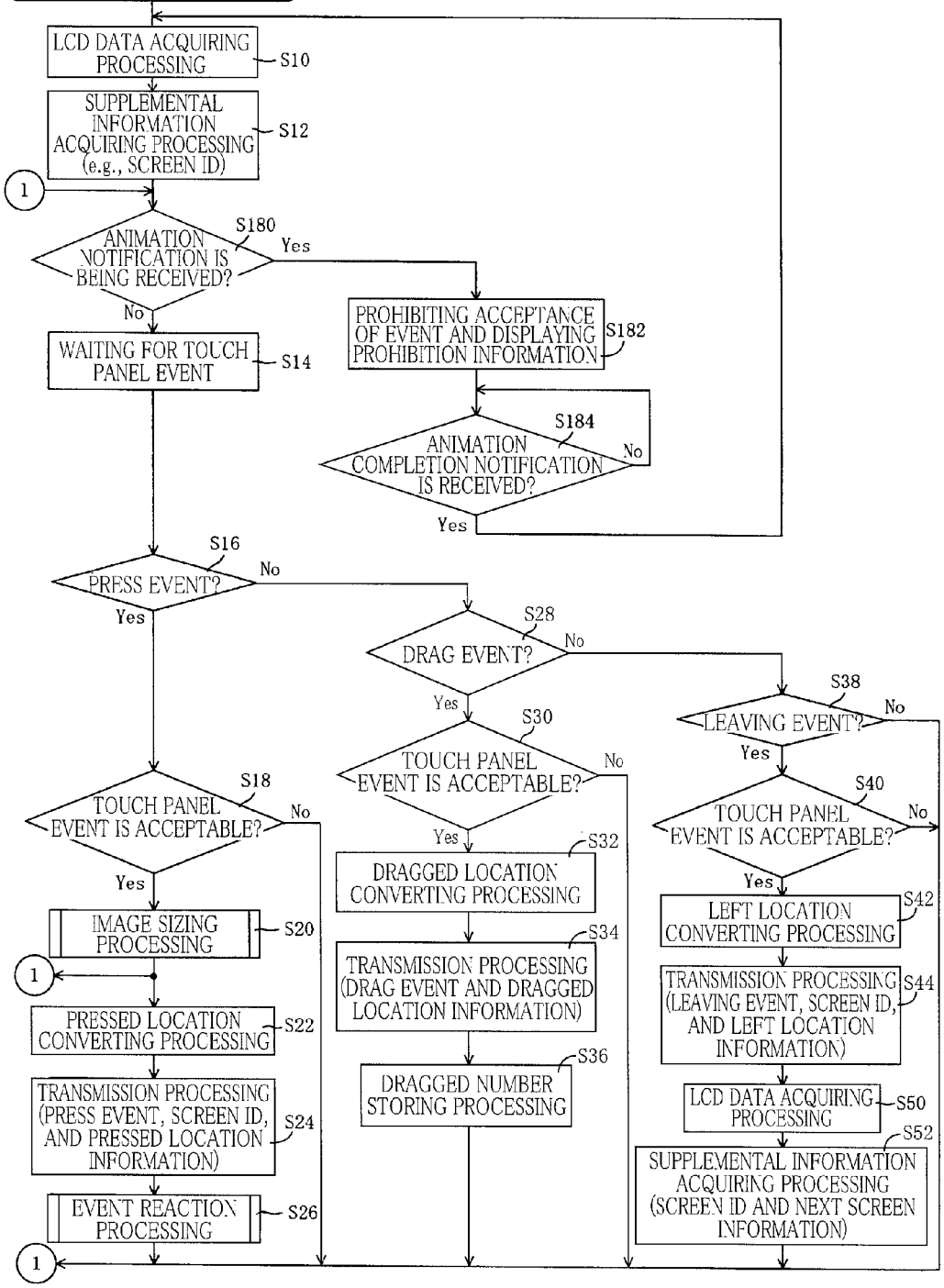
FIG. 12 is a flow chart illustrating a procedure of processings to be executed by the mobile terminal.

FIG. 12 illustrates a procedure of processings to be executed by the mobile terminal 40. The CPU 52 executes these processings by executing a remote control program stored in the flash memory 54. It is noted that the same numerals as used in the flow chart in FIG. 4 are respectively used for the same processings as in the flow chart in FIG. 12.

In this third embodiment, upon the completion of the processing at S12, the CPU 52 at S180 determines whether the CPU 52 is receiving the animation notification from the MFP 10 or not. This processing is on the precondition of the processings at S174 and S178 in FIG. 11. When the animation notification is not being received (S180: No), this flow goes to S14. When the animation notification is being received (S180: Yes), the CPU 52 at S182 prohibits the acceptance of the input operation on the touch panel 46 (i.e., the acceptance of the event) and displays information about the prohibition on the display region 44a of the LCD 44, and this flow goes to S184. It is noted that the CPU 52 at S182 may be configured to accept the input operation and not to execute a processing corresponding to the accepted input operation. The CPU 52 at S184 waits until the CPU 52 receives an animation completion notification from the MFP 10 (S184: No), and when the animation completion notification is received (S184: Yes), this flow goes to S10.

In the present embodiment, the flow goes to S180 also in the case where the negative decision is made at S18, S30, or 40, or the processing is completed at S26, S36, or S52.

The present embodiment described above provides the following effects in addition to the effects obtained in the first embodiment.

When the LCD data is requested, the MFP 10 does not transmit the LCD data until the animation display is finished (at S174 in FIG. 11). With this configuration, a duration of the state in which the image displayed on the display region 20a of the LCD 20 of the MFP 10 does not coincide with the image displayed on the display region 44a of the LCD 44 of the mobile terminal 40 can be shortened as possible.

Upon receiving the animation notification indicating that the animation display is being performed, from the MFP 10, the mobile terminal 40 does not accept the input operation on the touch panel 46. That is, the mobile terminal 40 does not accept the input operation on the touch panel 46 in the state in which the image displayed on the display region 20a of the LCD 20 of the MFP 10 does not coincide with the image displayed on the display region 44a of the LCD 44 of the mobile terminal 40. This configuration can avoid a situation in which an instruction not intended by the user is output to the MFP 10.

<Fourth Embodiment>

There will be next explained a fourth embodiment with reference to drawings, focusing mainly on differences between the first embodiment and the fourth embodiment.

In the above-described first embodiment, even when the animation display is performed on the display region 20a of the LCD 20 of the MFP 10 in response to the switch of the image, the animation display is not performed on the display region 44a of the LCD 44 of the mobile terminal 40. In this fourth embodiment, in contrast, the animation display is performed on the display region 44a of the LCD 44 of the mobile terminal 40.

FIG. 13 illustrates a procedure of processings to be executed by the MFP 10 in the present embodiment. These processings are executed by the CPU 12 of the MFP 10. It is noted that the same numerals as used in the flow chart in FIG. 9 are respectively used for the same processings as in the flow chart in FIG. 13.

As illustrated in FIG. 13, in the present embodiment, when there is no LCD data stored in the RAM 16 (S104: No), the CPU 12 at S173 determines whether the animation display is being performed or not for switching the image displayed on the display region 20a of the LCD 20. When the animation display is not being performed (S173: No), this flow goes to S106. When the animation display is being performed (S173: Yes), the CPU 12 at S190 sends the mobile terminal 40 the animation notification indicating that the animation display is being performed.

FIG. 14 illustrates a procedure of processings to be executed by the mobile terminal 40. The CPU 52 executes these processings by executing the remote control program stored in the flash memory 54. It is noted that the same numerals as used in the flow chart in FIG. 4 are respectively used for the same processings as in the flow chart in FIG. 14.

In the present embodiment, upon completion of the processing at S52, the CPU 52 at S200 determines whether the animation notification has been received or not. This processing is on the precondition of the processing at S190 in FIG. 13. When the animation notification is not received (S200: No), this flow goes to S54.

When the animation notification is received (S200: Yes), this flow returns to S50 to restart the LCD data acquiring processing.

The present embodiment described above provides the following effects in addition to the effects obtained in the first embodiment.

When the animation display is performed on the display region 20a of the LCD 20 of the MFP 10, the mobile terminal 40 requests the LCD data again. Accordingly, the animation display can be performed also on the display region 44a of the LCD 44 of the mobile terminal 40.

<Fifth Embodiment>

There will be next explained a fifth embodiment with reference to drawings, focusing mainly on differences between the first embodiment and the fifth embodiment.

Figure 15A:
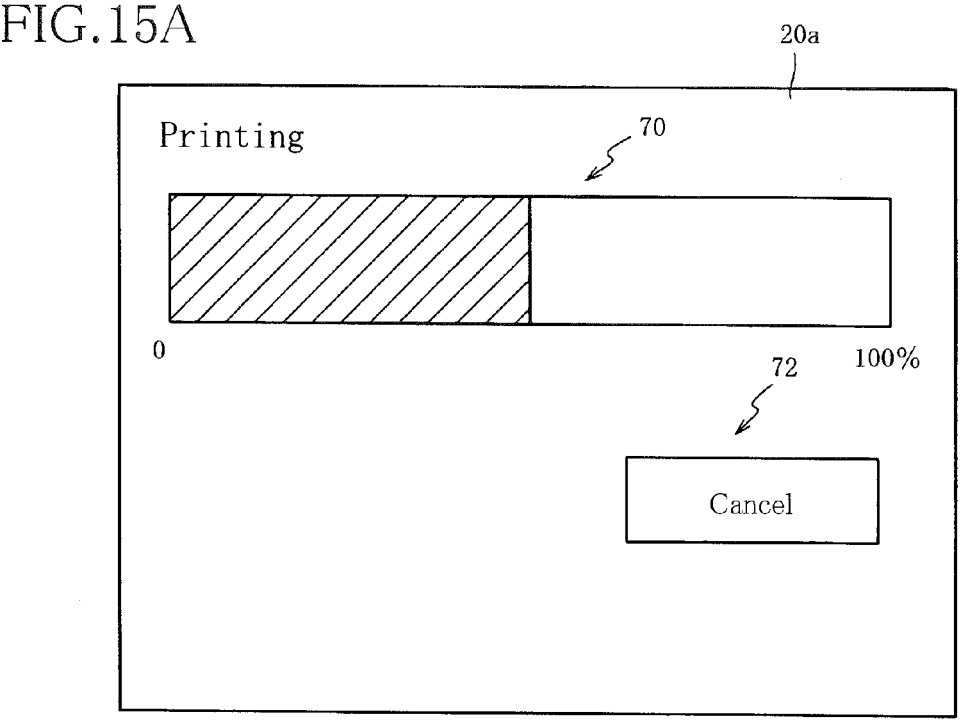
FIGS. 15A and 15B are views each illustrating an image displayed on the MFP in a fifth embodiment.
Figure 15B:
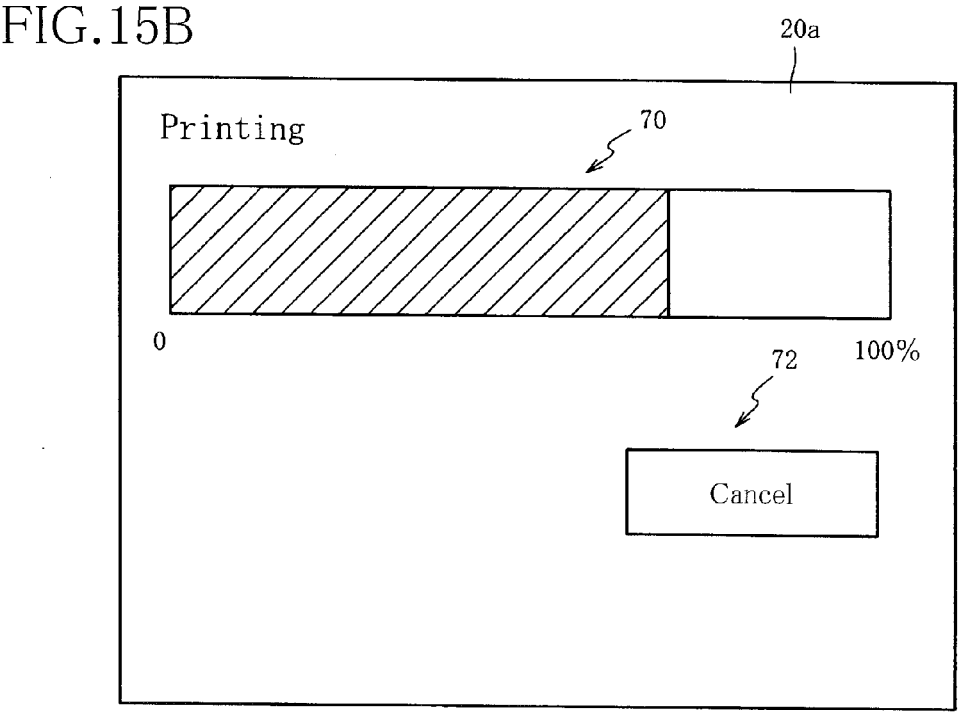

In the present embodiment, the MFP 10 displays a progress bar indicating a degree of progress of the processing, as the animation display performed on the display region 20a of the LCD 20 of the MFP 10. Each of FIGS. 15A and 15B illustrates one example of a display in which a progress bar 70 indicating the degree of progress of the print processing is displayed on the display region 20a of the LCD 20 of the MFP 10. The progress bar 70 displays the degree of progress of the print processing by changing the display according to the degree of progress of the print processing. The print processing has progressed in FIG. 15B than in FIG. 15A. In order to change or update the display of the progress bar 70 also on the display region 44a of the LCD 44 of the mobile terminal 40 according to the degree of progress of the print processing, this system may be configured such that information indicating that the progress bar 70 is displayed is incorporated into the supplemental information, and the mobile terminal 40 periodically requests transmission of the LCD data from the MFP 10 after the processing at S54 in FIG. 4.

Displayed on the display region 20a of the LCD 20 of the MFP 10 is a cancel button 72 for canceling the print processing before the print processing is completed. The LCD data acquiring processing causes the cancel button 72 to be displayed also on the display region 44a of the LCD 44 of the mobile terminal 40. Pressing and leaving the cancel button 72 displayed on the touch panel 46 of the mobile terminal 40 cancels the print processing in the MFP 10. With this configuration, the user can instruct the MFP 10 from the mobile terminal 40 to cancel the print processing.

<Sixth Embodiment>

There will be next explained a sixth embodiment, focusing mainly on differences between the first embodiment and the sixth embodiment.

In the third embodiment, when the animation display is performed on the MFP 10, the mobile terminal 40 does not transmit the touch panel event to the MFP 10 until the animation display is completed. In this sixth embodiment, however, the mobile terminal 40 transmits the touch panel event only in the case of particular animation.

Specifically, when the animation notification is being received at S180 in FIG. 12 in the third embodiment (S180: Yes) and when the CPU 52, based on the supplemental information acquired at S12, determines that the type of animation displayed on the MFP is the progress bar illustrated in FIGS. 15A and 15B, the flow goes to S14, and when the type of animation is not the progress bar, the flow goes to S182. It is noted that the MFP 10 incorporates information for identifying the type of animation displayed on the MFP 10, into the supplemental information to be transmitted to the mobile terminal 40.

In view of the above, the LCD 44 is one example of a display device or a terminal-side display device. The LCD 20 is one example of an apparatus-side display device. The touch panel 46 is one example of an input device or a terminal-side input device. The touch panel 22 is one example of an apparatus-side input device. The communication device 42 is one example of a communication device. The CPU 52 is one example of a controller. The MFP 10 is one example of a processing apparatus. The RAM 16 is one example of a storage device. The LCD data is one example of instruction image data.

<Other Embodiments>

While the embodiments of the present invention have been described above, it is to be understood that the invention is not limited to the details of the illustrated embodiments, but may be embodied with various changes and modifications, which may occur to those skilled in the art, without departing from the spirit and scope of the invention. Each embodiment may include at least a part of the configuration of another embodiment and may be at least partly replaced with the configuration of another embodiment. Alternative embodiments of the present invention will be explained below.

In the above-described embodiments, the mobile terminal 40 at S48 in FIG. 4 executes the wait processing corresponding to a length of time required for the animation display for switching the image displayed on the display region 20a of the LCD 20 of the MFP 10, but the present invention is not limited to this configuration. For example, when the mobile terminal 40 requests the MFP 10 to transmit the LCD data, the MFP 10 may transmit the LCD data after waiting for the completion of the animation display on the MFP 10. In this configuration, the mobile terminal 40 preferably does not accept the input on the touch panel 46 until the mobile terminal 40 requests the LCD data, then receives the LCD data, and finishes switching the image displayed on the display region 44a of the LCD 44.

In the above-described embodiments, the mobile terminal 40 requests the MFP 10 to transmit the LCD data when the image displayed on the display region 20a of the LCD 20 of the MFP 10 does not match the image displayed on the display region 44a of the LCD 44 of the mobile terminal 40, but the present invention is not limited to this configuration. For example, when the MFP 10 determines that the images do not coincide with each other, the MFP 10 may voluntarily transmit the LCD data to the mobile terminal 40. When the MFP 10 further transmits the screen ID to the mobile terminal 40 in this case, the mobile terminal 40 can recognize that the image data transmitted from the MFP 10 differs from the image being displayed on the display region 44a of the LCD 44.

The timing of transmission of the screen ID from the mobile terminal 40 to the MFP 10 is not limited to the timing of transmission of the coordinate information and the like (at S24) in response to the press event. For example, the mobile terminal 40 may periodically transmit the screen ID to the MFP 10 in a predetermined cycle.

In FIG. 2, considering the displacement of the object indicating the location at which the instructed point should be located for instructing the processing to be executed by the MFP 10 when the screen itself is switched, the mobile terminal 40 cannot accept the input operation performed on the touch panel 46 when the screen itself is switched. However, the present invention is not limited to this configuration. For example, the mobile terminal 40 may be configured not to switch the entire image displayed on the display region 20a of the LCD 20 of the MFP 10 but not to accept the input operation performed on the touch panel 46 of the mobile terminal 40 when only the object indicating the location at which the instructed point should be located for instructing the processing to be executed by the MFP 10 is displaced.

The request of the LCD data and the request of the supplemental information are separately output from the mobile terminal 40 to the MFP 10 in the above-described embodiments, but the present invention is not limited to this configuration. For example, the request of the LCD data may cause the MFP 10 to transmit the LCD data and the supplemental information corresponding thereto.

The input operation performed on the touch panel 46 of the mobile terminal 40 is not accepted at S46 and S54 in FIG. 4 within the period of the animation display on the MFP 10 in the above-described embodiments, but the present invention is not limited to this configuration. For example, the mobile terminal 40 may be configured to change the display of the display region 44a of the LCD 44 in response to the input operation and to display information indicating that the input operation is disabled, on the display region 44a of the LCD 44, and not to send the MFP 10 the coordinate information and the input event relating to the input operation.

The input operation on the touch panel 46 is not accepted within the period of, e.g., the wait processing at S48 in the processing FIG. 4 in the above-described embodiments. Even within this period, however, the touch panel 46 may accept an input operation not relating to the instruction provided for the MFP 10, and one example of such an input operation is the pinch-out operation for instructing enlargement of the screen.

In the method in FIG. 7B, the reference point and the predetermined point are respectively set at the drawing start coordinates (X, Y) and the drawing end coordinates (Xe, Ye), and the legnth of each of the coordinate components from the reference point to the predetermined point is used as the standard-size positional information for identifying the location of the instructed point in the case where the image is of a standard size, but the present invention is not limited to this configuration. For example, the predetermined point is set by the coordinate component of the midpoint of the image in the X-axis direction and the coordinate component of the midpoint of the image in the Y-axis direction. Also in this configuration, the length of each of the coordinate components from the reference point to the predetermined point may be used as the standard-size positional information for identifying the location of the instructed point in the case where the image is of a standard size.

Regardless of whether the size of the image is increased or reduced, the coordinate information to be transmitted from the mobile terminal 40 to the MFP 10 is not limited to coordinate information integrated with the standard-size positional information for identifying the location of the instructed point in the case where the image is of a standard size (the enlargement ratio k in FIG. 7A and (Xe−Y, Ye−Y) in FIG. 7B). For example, instead of the method illustrated in FIG. 7A, the coordinate components (A−X, B−Y) provided with the drawing start coordinates as the origin point and the enlargement ratio k as the standard-size positional information may be separately transmitted to the MFP 10. Also in this configuration, the MFP 10 can identify the location of the instructed point in the case where the image is of a standard size. Also, the information transmitted from the mobile terminal 40 to the MFP 10 is not limited to information containing the standard-size positional information. That is, in a case where the processing for increasing or reducing the size of the image is not executed on the mobile terminal 40, even when the information transmitted from the mobile terminal 40 to the MFP 10 does not contain the standard-size positional information, the MFP 10 can identify the location of the instructed point in the case where the image is of a standard size.

The method of requesting the MFP 10 to transmit the LCD data is not limited to a method using the leaving operation on the touch panel 46 as a trigger. For example, the method may use the press operation on the touch panel 46 as a trigger.

The method of requesting the MFP 10 to transmit the LCD data is not limited to a method using the input event on the touch panel 46 as a trigger. For example, the method of requesting the MFP 10 to transmit the LCD data may be a method of requesting the LCD data in a cycle of a predetermined length of time. In this configuration, this system may be configured such that the mobile terminal 40 further transmits the screen ID to the MFP 10, and the MFP 10 transfers the LCD data to the mobile terminal 40 on condition that the screen ID of the image displayed on the display region 44a of the LCD 44 of the mobile terminal 40 does not coincide with the screen ID of the image displayed on the display region 20a of the LCD 20 of the MFP 10.

The MFP 10 may not include the LCD 20 or the touch panel 22. In a case where the MFP 10 not including the LCD 20 or the touch panel 22 is configured to send the mobile terminal 40 image data representative of the image for guiding the input operation on the touch panel 46, the user can operate the MFP 10 by performing the input operation on the touch panel 46 of the mobile terminal 40. In this configuration, the MFP 10 cannot set the image to be displayed on the display region 20a of the LCD 20, but in a case where the MFP 10 sets images for guiding operations acceptable on the MFP 10, the MFP 10 can execute, e.g., the processings at S128-S140 in FIG. 9 for comparing the screen IDs with each other. In this configuration, examples of the situation in which the screen IDs do not match each other as a result of the comparison include: a case where a noise occurs in the mobile terminal 40, the MFP 10, or communication between the mobile terminal 40 and the MFP 10; and a case where a malfunction occurs in the mobile terminal 40 due to a temporal power shortage of the mobile terminal 40.

The input devices (i.e., the terminal-side input device and the apparatus-side input device) are not limited to the touch panel 22, 46. For example, the input devices may be devices configured to use image recognition to detect the input operations on the LCDs 20, 44 such as pressing, leaving, and dragging.

The communication between the mobile terminal 40 and the MFP 10 when the mobile terminal 40 controls the MFP 10 is not limited to the Wi-Fi communication. For example, the communication may be communication using the telephone network communication device 50.

The device or apparatus (i.e., the processing apparatus) controllable by the mobile terminal 40 is not limited to the MFP 10. For example, the mobile terminal 40 may control a home energy management system or device equipped in a home. In this configuration, the use of the telephone network communication device 50 allows a user to activate devices such as an air-conditioning equipment before getting home from a place far from his or her home and allows a user to instruct the system to use energy generated by solar panels for boiling water with a higher priority, for example. In a case where the energy management device is equipped with a touch panel, the user can provide instructions from the outside of his or her home with operations corresponding to operations on the touch panel of the energy management device in his or her home.

The communication terminal is not limited to a device having functions other than the functions relating to the operations for the processing apparatus, e.g., the MFP 10. That is, the communication terminal is not limited to a device like a smartphone having various functions including the function of conversation over the telephone network. However, the communication terminal may be a device specialized for the operations for the processing apparatus.

The processings, i.e., software processings executed by the CPU 52 executing the operation support program in the above-described embodiments may be partly or completely replaced with hardware processings executed by, e.g., an ASIC.

The processings to be executed by the processing apparatus include the processing for switching the screen in addition to the processings for executing the various functions such as the processing for executing the copying function, the processing for executing the facsimile function, and the processing for executing the scanning function. For example, the processings to be executed by the processing apparatus include a processing in which when the Fax icon is chosen on the screen illustrated in FIG. 2A, the screen or image is switched to the screen or image illustrated in FIG. 2C.

The screen ID for the image data representative of the image being displayed on the MFP 10 is one example of identification information about the instruction image data representative of an instruction image currently displayed. As illustrated in FIG. 3, the screen IDs respectively correspond to the image data. Accordingly, the screen IDs are assigned also to image data representative of images not displayed on the MFP 10.

What is claimed is:

1. A non-transitory storage medium storing a plurality of instructions executable by a computer of a communication terminal,
   the communication terminal comprising: a display; an input device configured to detect an instructed point which is a point on the display and at which an instruction is provided with an input object, the input device being configured to accept a plurality of types of input gestures as a type of an input event; and a communication device configured to communicate with a processing apparatus,
   when executed by the computer, the plurality of instructions causing the communication terminal to perform:
      receiving instruction image data from the processing apparatus, the instruction image data being for displaying, on the display, a plurality of instruction images, each image for instructing a processing to be executed by the processing apparatus;
      receiving a plurality of image IDs from the processing apparatus, each of the plurality of image IDs being for identifying a corresponding one of the plurality of instruction images,
      displaying a first instruction image on the display based on the received instruction image data, the first instruction image being one of the plurality of instruction images;
      identifying a type of input gesture performed on the input device from among the plurality of types of input gestures, in response to an instruction provided on the input device with the input object in a state in which the first instruction image is displayed; and
      transmitting, to the processing apparatus, (i) the identified type of input gesture from among the plurality of types of input gestures, (ii) coordinate information about the instructed point on the display which is detected by the input device in a state in which the first instruction image is displayed, and (iii) a first image ID identifying the first instruction image among the plurality of instruction images, the first image ID being one of the plurality of image IDs.

2. The non-transitory storage medium according to claim 1, wherein when executed by the computer, the plurality of instructions cause the communication terminal to perform:
   making a request of the processing apparatus for transmission of the instruction image data; and
   receiving the instruction image data transmitted from the processing apparatus in response to the request of the processing apparatus for transmission of the instruction image data.

3. The non-transitory storage medium according to claim 1,
   wherein when executed by the computer, the plurality of instructions cause the communication terminal to perform:
      receiving, from the processing apparatus, a difference notification indicating that the first image ID about the instruction image data representative of the first instruction image currently displayed on the display of the communication terminal differs from a second image ID about image data representative of an image currently displayed on the processing apparatus; and
      displaying, on the display, an image indicating that the first image ID about the instruction image data representative of the first instruction image currently displayed on the display of the communication terminal differs from the second image ID about the image data representative of the image currently displayed on the processing apparatus, in response to the reception of the difference notification.

4. The non-transitory storage medium according to claim 1,
   wherein when executed by the computer, the plurality of instructions cause the communication terminal to perform:
      receiving, from the processing apparatus, a difference notification indicating that the first image ID about the instruction image data representative of the first instruction image currently displayed on the display of the communication terminal differs from a second image ID about image data representative of an image currently displayed on the processing apparatus; and
      requesting the processing apparatus to transmit the image data representative of the image currently displayed on the processing apparatus, in response to the reception of the difference notification.

5. The non-transitory storage medium according to claim 1, wherein when executed by the computer, the plurality of instructions cause the communication terminal not to transmit, to the processing apparatus, a type of input gesture on the input device which is performed within at least a period extending from a request of the processing apparatus for transmission of the instruction image data, to the reception of the instruction image data transmitted in response to request.

6. The non-transitory storage medium according to claim 2, wherein when executed by the computer, the plurality of instructions cause the communication terminal to perform:
   receiving a request instruction which is an instruction transmitted from the processing apparatus to the communication terminal and which instructs the communication terminal to request the instruction image data from the processing apparatus; and
   making the request of the processing apparatus for transmission of the instruction image data, in response to the reception of the request instruction.

7. The non-transitory storage medium according to claim 1,
   wherein the processing apparatus comprises: an apparatus-side display; and an apparatus-side input device configured to detect an instructed point which is a point on the apparatus-side display and at which an instruction is provided with an input object, and
   wherein the first instruction image to be displayed based on the received instruction image data is identical to an image to be displayed on the apparatus-side display.

8. The non-transitory storage medium according to claim 2, wherein the request of the processing apparatus for transmission of the instruction image data is made based on transmission of the identified type of input gesture to the processing apparatus.

9. The non-transitory storage medium according to claim 8,
   wherein the input event comprises a choice of a point on the display and a confirmation of the choice of the point, and
   wherein the request of the processing apparatus for transmission of the instruction image data is made based on transmission of the confirmation of the choice of the point to the processing apparatus.

10. A non-transitory storage medium storing a plurality of instructions executable by a computer of a communication terminal, the communication terminal comprising: a display; an input device configured to detect an instructed point which is a point on the display and at which an instruction is provided with an input object; and a communication device configured to communicate with a processing apparatus, when executed by the computer, the plurality of instructions causing the communication terminal to perform:

receiving instruction image data from the processing apparatus, the instruction image data being for displaying, on the display, an instruction image for instructing a processing to be executed by the processing apparatus;

displaying the instruction image on the display based on the received instruction image data;

identifying an input event on the input device in response to an instruction provided on the input device with the input object in a state in which the instruction image is displayed; and transmitting, to the processing apparatus, the identified input event and coordinate information about the instructed point on the display which is detected by the input device in a state in which the instruction image is displayed, wherein when executed by the computer, the plurality of instructions cause the communication terminal to perform:

making a request of the processing apparatus for transmission of the instruction image data; and receiving the instruction image data transmitted from the processing apparatus in response to the request of the processing apparatus for transmission of the instruction image data, wherein the request of the processing apparatus for transmission of the instruction image data is made based on transmission of the input event to the processing apparatus, wherein the input event comprises a choice of a point on the display and a confirmation of the choice of the point, wherein the request of the processing apparatus for transmission of the instruction image data is made based on transmission of the confirmation of the choice of the point to the processing apparatus, wherein the processing apparatus comprises: an apparatus-side display; and an apparatus-side input device configured to detect an instructed point which is a point on the apparatus-side display and at which an instruction is provided with an input object, wherein the instruction image to be displayed based on the received instruction image data is identical to an image to be displayed on the apparatus-side display, and wherein when executed by the computer, the plurality of instructions cause the communication terminal to wait for making the request of the processing apparatus for transmission of the instruction image data, for a predetermined period after the transmission of the confirmation of the choice of the point to the processing apparatus.

11. The non-transitory storage medium according to claim 10, wherein when executed by the computer, the plurality of instructions cause the communication terminal not to transmit the input event having occurred within the predetermined period, to the processing apparatus.

12. A communication terminal, comprising:

a display;

an input device configured to detect an instructed point which is a point on the display and at which an instruction is provided with an input object, the input device being configured to accept a plurality of types of input gestures as a type of an input event;

a communication device configured to communicate with a processing apparatus; and a controller configured to:

receive instruction image data from the processing apparatus, the instruction image data being for displaying, on the display, a plurality of instruction images, each image for instructing a processing to be executed by the processing apparatus;

receive a plurality of IDs from the processing apparatus, each of the plurality of IDs being for identifying a corresponding one of the plurality of instruction images;

display a first instruction image on the display based on the received instruction image data, the first instruction image being one of the plurality of instruction images;

identify a type of input gesture performed on the input device from among the plurality of types of input gestures, in response to an instruction provided on the input device with the input object in a state in which the first instruction image is displayed; and transmit, to the processing apparatus, (i) the identified type of input gesture from among the plurality of types of input gestures, (ii) coordinate information about the instructed point on the display which is detected by the input device in a state in which the first instruction image is displayed, and (iii) a first image ID identifying the first instruction image among the plurality of instruction images, the first image ID being one of the plurality of image IDs, the controller being configured to execute a control using at least one of a software processing and a hardware processing.

13. The communication terminal according to claim 12, wherein the controller is configured to:

make a request of the processing apparatus for transmission of the instruction image data; and receive the instruction image data transmitted from the processing apparatus in response to the request of the processing apparatus for transmission of the instruction image data.

14. A processing apparatus controllable by a communication terminal, the communication terminal comprising: a display; an input device configured to detect an instructed point which is a point on the display and at which an instruction is provided with an input object, the input device being configured to accept a plurality of types of input gestures as a type of an input event; and a communication device configured to communicate with the processing apparatus, the processing apparatus comprising a controller configured to:

transmit instruction image data to the communication terminal, the instruction image data being for displaying, on the display, a plurality of instruction images, each image for instructing a processing to be executed by the processing apparatus;

transmit a plurality of image IDs to the communication terminal, each of the plurality of image IDs being for identifying a corresponding one of the plurality of instruction images;

receive, from the communication terminal, (i) a type of input gesture performed on the input device among the plurality of types of input gestures, (ii) coordinate information about the instructed point on the display which is detected by the input device, and (iii) a first image ID identifying the first instruction image among the plurality of instruction images, the first image ID being one of the plurality of image IDs; and execute a processing based on the received type of input gesture, coordinate information and the first image ID.

15. The processing apparatus according to claim 14, wherein the controller is configured to:

acquire, from the communication terminal, the first image ID about instruction image data representative of the first instruction image currently displayed on the display of the communication terminal;

determine whether the acquired first image ID coincides with a second image ID about image data representative of an image currently displayed on the processing apparatus; and execute a processing based on the received type of input gesture when the acquired the first image ID coincides with the second image ID about the image data representative of the image currently displayed on the processing apparatus.

16. The processing apparatus according to claim 15, wherein the controller is configured to transmit, to the communication terminal, information indicating that the acquired first image ID does not coincide with the second image ID about the image data representative of the image currently displayed on the processing apparatus, when the acquired first image ID does not coincide with the second image ID about the image data representative of the image currently displayed on the processing apparatus.

17. The processing apparatus according to claim 14, further comprising an apparatus-side display; and an apparatus-side input device configured to detect an instructed point which is a point on the apparatus-side display and at which an instruction is provided with an input object, wherein the controller is configured to:

receive, from the communication terminal, a request of the processing apparatus for transmission of the instruction image data; and transmit image data representative of an image currently displayed on the apparatus-side display, to the communication terminal, based on the reception of the request of the processing apparatus for transmission of the instruction image data.

18. The processing apparatus according to claim 14, further comprising an apparatus-side display; and an apparatus-side input device configured to detect an instructed point which is a point on the apparatus-side display and at which an instruction is provided with an input object, wherein the controller is configured to transmit, to the communication terminal, image data representative of an image currently displayed on the apparatus-side display.

19. The processing apparatus according to claim 14, wherein the controller is configured to:

receive a request of the processing apparatus for transmission of the instruction image data; and transmit the instruction image data to the communication terminal in response to the received request of the processing apparatus for transmission of the instruction image data.

20. A processing apparatus controllable by a communication terminal, the communication terminal comprising: a display; an input device configured to detect an instructed point which is a point on the display and at which an instruction is provided with an input object; and a communication device configured to communicate with the processing apparatus, the processing apparatus comprising a controller configured to:

transmit instruction image data to the communication terminal, the instruction image data being for displaying, on the display, an instruction image for instructing a processing to be executed by the processing apparatus;

receive, from the communication terminal, an input event on the input device and coordinate information about the instructed point on the display which is detected by the input device; and execute a processing based on the received input event and coordinate information, wherein the processing apparatus further comprises an apparatus-side display; and an apparatus-side input device configured to detect an instructed point which is a point on the apparatus-side display and at which an instruction is provided with an input object, wherein the controller is configured to:

receive, from the communication terminal, a request of the processing apparatus for transmission of the instruction image data; and transmit image data representative of an image currently displayed on the apparatus-side display, to the communication terminal, based on the reception of the request of the processing apparatus for transmission of the instruction image data, wherein the processing apparatus further comprises a storage device, wherein the controller is configured to, when an image displayed on the apparatus-side display is switched in a state in which an image based on image data having not been transmitted to the communication terminal is displayed on the apparatus-side display, store, into the storage device, the image data representative of the image displayed before the image is switched.

21. The processing apparatus according to claim 20, wherein the controller is configured to, based on a reception of the request of the transmission of the instruction image data in a state in which the image data is stored in the storage device before the switch, transmit the image data stored before the switch, to the communication terminal.

* * * * *